US009596745B2

(12) United States Patent
Laberge et al.

(10) Patent No.: US 9,596,745 B2
(45) Date of Patent: Mar. 14, 2017

(54) APPARATUS FOR ACCELERATING AND COMPRESSING PLASMA

(71) Applicant: General Fusion Inc., Burnaby (CA)

(72) Inventors: Michel G. Laberge, West Vancouver (CA); Meritt Reynolds, New Westminster (CA)

(73) Assignee: General Fusion Inc., Burnaby, British Columbia (CA)

( * ) Notice: Subject to any disclaimer, the term of this patent is extended or adjusted under 35 U.S.C. 154(b) by 127 days.

(21) Appl. No.: 14/422,675

(22) PCT Filed: Aug. 29, 2013

(86) PCT No.: PCT/CA2013/050670
§ 371 (c)(1),
(2) Date: Feb. 19, 2015

(87) PCT Pub. No.: WO2014/032186
PCT Pub. Date: Mar. 6, 2014

(65) Prior Publication Data
US 2015/0216028 A1 Jul. 30, 2015

Related U.S. Application Data

(60) Provisional application No. 61/694,550, filed on Aug. 29, 2012.

(51) Int. Cl.
H05B 31/26 (2006.01)
H05H 1/54 (2006.01)
(Continued)

(52) U.S. Cl.
CPC ............... H05H 1/54 (2013.01); G21B 1/00 (2013.01); G21B 3/00 (2013.01); H05H 1/105 (2013.01);
(Continued)

(58) Field of Classification Search
CPC .................... H05H 1/24; H05H 1/54
(Continued)

(56) References Cited

U.S. PATENT DOCUMENTS 2,992,345 A 7/1961 Hansen
3,194,739 A 7/1965 Kerst et al.
(Continued)

FOREIGN PATENT DOCUMENTS

CA 2750441 4/2012
EP 2460160 B1 6/2013
(Continued)

OTHER PUBLICATIONS

R. Raman et al., "Compact Toroid Fueling for ITER", Fusion Engineering and Design 39-40 (1998), pp. 977-985.
(Continued)

Primary Examiner — Don Le
(74) Attorney, Agent, or Firm — Knobbe, Martens, Olson & Bear, LLP

(57) ABSTRACT

Examples of a plasma acceleration and compression device are described. The device includes a plasma accelerator with a high compression funnel section extending from an inlet of the accelerator and an elongated section connected to the high compression funnel section that can extend from the end of the funnel section to an accelerator's outlet. The funnel section can be a cone with a steep tapering while the elongated section can have a mild, gentle, tapering along its length toward the outlet. The device further includes a power source for providing a current pulse to the accelerator to generate a pushing flux to accelerate and compress a plasma torus throughout the accelerator. The current pulse can be so shaped that the current pulse behind the plasma torus at the outlet of the elongated section is significantly smaller than the current pulse at the first end of the elongated section
(Continued)

while the pressure of the plasma torus at the outlet of the elongated section is greater than the pressure of the plasma torus at the beginning of the elongated section.

13 Claims, 9 Drawing Sheets

(51) Int. Cl.
  *G21B 3/00* (2006.01)
  *H05H 1/16* (2006.01)
  *G21B 1/00* (2006.01)
  *H05H 1/10* (2006.01)
(52) U.S. Cl.
  CPC .............. *H05H 1/16* (2013.01); *Y02E 30/122* (2013.01); *Y02E 30/18* (2013.01)
(58) Field of Classification Search
  USPC .................................................... 315/111.61
  See application file for complete search history.

(56) References Cited

U.S. PATENT DOCUMENTS

| | | | |
|---|---|---|---|
| 3,346,458 A | 10/1967 | Schmidt | |
| 3,579,028 A * | 5/1971 | Paine | H05H 1/52 313/155 |
| 4,023,065 A | 5/1977 | Koloc | |
| 4,068,147 A | 1/1978 | Wells | |
| 4,129,772 A | 12/1978 | Navratil et al. | |
| 4,228,380 A | 10/1980 | Wells | |
| 4,290,848 A | 9/1981 | Sudan | |
| 4,292,568 A | 9/1981 | Wells et al. | |
| 4,735,762 A | 4/1988 | Lasche | |
| 4,790,735 A | 12/1988 | Mayer | |
| 5,015,432 A | 5/1991 | Koloc | |
| 5,041,760 A | 8/1991 | Koloc | |
| 5,397,961 A | 3/1995 | Ayers et al. | |
| 5,429,030 A | 7/1995 | Tidman | |
| 5,811,944 A | 9/1998 | Sampayan et al. | |
| 5,821,705 A | 10/1998 | Sampayan et al. | |
| 6,396,213 B1 | 5/2002 | Koloc | |
| 6,477,216 B2 | 11/2002 | Koloc | |
| 6,593,539 B1 | 7/2003 | Miley et al. | |
| 6,611,106 B2 | 8/2003 | Monkhorst et al. | |
| 6,628,740 B2 | 9/2003 | Monkhorst et al. | |
| 6,664,740 B2 | 12/2003 | Rostoker et al. | |
| 6,680,480 B2 | 1/2004 | Schoen | |
| 6,850,011 B2 | 2/2005 | Monkhorst et al. | |
| 6,852,942 B2 | 2/2005 | Monkhorst et al. | |
| 6,888,907 B2 | 5/2005 | Monkhorst et al. | |
| 6,891,911 B2 | 5/2005 | Rostoker et al. | |
| 6,894,446 B2 | 5/2005 | Monkhorst et al. | |
| 6,995,515 B2 | 2/2006 | Rostoker et al. | |
| 7,002,148 B2 | 2/2006 | Monkhorst et al. | |
| 7,015,646 B2 | 3/2006 | Rostoker et al. | |
| 7,026,763 B2 | 4/2006 | Rostoker et al. | |
| 7,119,491 B2 | 10/2006 | Rostoker et al. | |
| 7,126,284 B2 | 10/2006 | Rostoker et al. | |
| 7,129,656 B2 | 10/2006 | Rostoker et al. | |
| 7,173,385 B2 | 2/2007 | Caporaso et al. | |
| 7,180,242 B2 | 2/2007 | Rostoker et al. | |
| 7,230,201 B1 | 6/2007 | Miley et al. | |
| 7,232,985 B2 | 6/2007 | Monkhorst et al. | |
| 7,391,160 B2 | 6/2008 | Monkhorst et al. | |
| 7,439,678 B2 | 10/2008 | Rostoker et al. | |
| 7,459,654 B2 | 12/2008 | Monkhorst et al. | |
| 7,477,718 B2 | 1/2009 | Rostoker et al. | |
| 7,486,758 B1 | 2/2009 | Turchi | |
| 7,569,995 B2 | 8/2009 | Rostoker et al. | |
| 7,576,499 B2 | 8/2009 | Caporaso et al. | |
| 7,613,271 B2 | 11/2009 | Rostoker et al. | |
| 7,679,025 B1 * | 3/2010 | Krishnan | G21G 4/02 219/121.48 |
| 7,719,199 B2 | 5/2010 | Monkhorst et al. | |
| 7,831,008 B2 | 11/2010 | Perkins et al. | |
| 8,031,824 B2 | 10/2011 | Bystritskii et al. | |
| 8,537,958 B2 | 9/2013 | Laberge et al. | |
| 8,887,618 B2 | 11/2014 | McIlwraith et al. | |
| 8,891,719 B2 | 11/2014 | Howard et al. | |
| 8,994,271 B2 * | 3/2015 | Kindel | A61B 18/042 315/111.21 |
| 9,271,383 B2 | 2/2016 | Howard et al. | |
| 9,424,955 B2 * | 8/2016 | Laberge | G21B 1/057 |
| 9,463,478 B2 | 10/2016 | Suponitsky et al. | |
| 2006/0039519 A1 | 2/2006 | Rostoker et al. | |
| 2006/0076897 A1 | 4/2006 | Rostoker et al. | |
| 2006/0198483 A1 | 9/2006 | Laberge | |
| 2006/0198486 A1 | 9/2006 | Laberge et al. | |
| 2006/0198487 A1 | 9/2006 | Laberge | |
| 2006/0254520 A1 | 11/2006 | Rostoker et al. | |
| 2006/0267504 A1 | 11/2006 | VanDrie et al. | |
| 2007/0058770 A1 | 3/2007 | Fissenko et al. | |
| 2007/0096659 A1 | 5/2007 | Monkhorst et al. | |
| 2007/0158534 A1 | 7/2007 | Monkhorst et al. | |
| 2007/0172017 A1 | 7/2007 | Rostoker et al. | |
| 2008/0205573 A1 | 8/2008 | Larson | |
| 2008/0251502 A1 | 10/2008 | Monkhorst et al. | |
| 2009/0152094 A1 | 6/2009 | Fissenko et al. | |
| 2009/0213975 A1 | 8/2009 | Sturt | |
| 2010/0067639 A1 | 3/2010 | Sturt | |
| 2010/0163130 A1 | 7/2010 | Laberge et al. | |
| 2010/0215136 A1 | 8/2010 | Rusnak et al. | |
| 2011/0019789 A1 | 1/2011 | Rostoker et al. | |
| 2011/0026657 A1 * | 2/2011 | Laberge | H05H 1/16 376/133 |
| 2011/0026658 A1 * | 2/2011 | Howard | G21B 3/006 376/133 |
| 2011/0158369 A1 | 6/2011 | Larson | |
| 2011/0243292 A1 | 10/2011 | Howard et al. | |
| 2011/0293056 A1 | 12/2011 | Slough | |
| 2012/0014491 A1 | 1/2012 | Deeth | |
| 2012/0031070 A1 | 2/2012 | Slough et al. | |
| 2012/0085920 A1 | 4/2012 | Guethlein | |
| 2012/0155591 A1 | 6/2012 | Freeze | |
| 2014/0165552 A1 | 6/2014 | McIlwraith et al. | |
| 2014/0247913 A1 | 9/2014 | Laberge et al. | |
| 2015/0021339 A1 * | 1/2015 | Felts | C23C 16/30 220/626 |
| 2015/0152899 A1 | 6/2015 | McIlwraith et al. | |
| 2016/0129142 A1 * | 5/2016 | Nettesheim | A61L 9/22 422/29 |

FOREIGN PATENT DOCUMENTS

| | | |
|---|---|---|
| JP | S55-501066 | 12/1980 |
| WO | WO 80/00045 | 1/1980 |
| WO | WO 93/23587 | 11/1993 |
| WO | WO 2011/014577 | 2/2011 |
| WO | WO 2011/084903 A1 | 7/2011 |
| WO | WO 2011/154172 A1 | 12/2011 |
| WO | WO 2012/113057 A1 | 8/2012 |
| WO | WO 2014/032186 A1 | 3/2014 |

OTHER PUBLICATIONS

R. Raman et al., "Experimental Demonstration of Nondisruptive, Central Fueling of a Tokamak by Compact Toroid Injection", Phys. Rev. Lett., 1994, pp. 3101-3105.
R. Raman et al., "Experimental Demonstration of Tokamak Fueling by Compact Toroid Injection", Nuclear Fusion, vol. 37, 1997, pp. 967-972.
R. Raman et al., "ITER Task D315 (1997): Conceptual Design Definition of a Compact Toroid Injection System", CFFTP G-9729, Sep. 1997, in 24 pages.
Roger Raman et al., "Design of the Compact Toroid Fueler Tokamak de Varennes", Fusion Technology, A Journal of the Nuclear Society, vol. 24, No. 3, Nov. 1993, pp. 239-250.
Y.C.F. Thio et al., "Magnetized Target Fusion Driven by Plasma Liners", 2002, in 3 pages.

(56) References Cited

OTHER PUBLICATIONS

Y. C. F. Thio et al., "Magnetized Target Fusion in a Spheroidal Geometry With Standoff Drivers," Fusion Technology 20, 1991, in 22 pages.
Y. C. F. Thio et al', "Pulsed Electromagnetic Acceleration of Plasmas," 38th AIAA/ASME/SAE/ASEE Joint Propulsion Conference & Exhibit, Jul. 7-10, 2002, in 9 pages.
M.T. Tobin et al, "The Compact Torus Accelerator, A Driver for ICF", UCRL-93901-R1, Lawrence Livermore National Laboratory, Jul. 31, 1986, in 9 pages.
F. D. Witherspoon et al., "A contoured gap coaxial plasma gun with injected plasma armature," American Institute of Physics, Review of Scientific Instruments 80, 083506, Aug. 2009, in 15 pages.
F. D. Witherspoon et al., "Pulsed Injector Development for Dense Plasma Jets," Research Funded by the DOE Office of Fusion Energy Science through Grants DE-FG02-04ER83978, DE-FG02-05ER54810, DE-FG02-05ER84189, Feb. 2007, in 32 pages.
G.A. Wurden et al., "FRC Plasma Studies on the FRX-L Plasma Injector for MTF", Paper IC/P6-53, 50th IAEA Fusion Energy Conference, Nov. 2004, in 7 pages.
G.A. Wurden et al., "High Pressure Field Reversed Configuration Plasmas in FRX-L for Magnetized Target Fusion", Jan. 26, 2006, in 2 pages.
G.A. Wurden et al., "Magnetized Target Fusion: A Burning FRC Plasma in an Imploded Metal Can", J. Plasma Fusion Res. Series, vol. 2, Aug. 1999, pp. 238-241.
G.A. Wurden et al., "Progress on the FRX-L FRC Plasma Injector at LANL for Magnetized Target Fusion", Mar. 1, 2002, pp. 1-6.
G.A. Wurden, Letter to Dr. Laberge, May 2007, in 1 page.
C. Xiao et al., "Improved Confinement Induced by Tangential Injection of Compact Torus Into the Saskatchewan Torus-Modified (STOR-M) Tokamak", Phys. Plasmas, vol. 11, No. 8, Aug. 2004, pp. 4041-4049.
International Search Report and Written Opinion for International Application No. PCT/CA2013/050670, mailed Dec. 4, 2013, in 10 pages.
B. Bauer et al., "Magnetized High Energy Density Laboratory Plasmas," http://fusionenergy.lanl.gov/mhedlp-wp.pdf, Apr. 20, 2007, in 24 pages.
Bellan, P.M., "Spheromaks: A practical application of magnetohydrodynamic dynamos and plasma self-organization," Imperial College Press, 2000, pp. 1-9, 268-275.
Browning, P.K. et al., "Power Flow in a Gun-Injected Spheromak Plasma", The American Physical Society, Physical Review Letters, vol. 68, No. 11, Mar. 16, 1992, pp. 1718-1721.
J. H. Degnan et al, "Compression of compact toroids in conical-coaxial geometry", Fusion Technology, Mar. 1995, vol. 27, Issue 2, pp. 107-114.
J. H. Degnan et al., "Compact toroid formation, compression, and acceleration", Phys. Fluids B, Aug. 1993, vol. 5, Issue 8, pp. 2938-2958.
M. Delage et al., "Progress Towards Acoustic Magnetized Target Fusion: An Overview of the R&D Program at General Fusion", 33rd Ann. Conf. Can. Nuc. Soc., Jun. 2012, in 13 pages.
R.C. Duck et al., "Structure of the n=1 responsible for relaxation and current drive during sustainment of the SPHEX spheromak", Plasma Physics and Controlled Fusion, vol. 39, No. 5, May 1997, 715-736.
J. Eddleman et al., "Final Report on the LLNL Compact Torus Acceleration Project," Lawrence Livermore National Laboratory, UCRL-ID-120238, Mar. 19, 1995, in 62 pages.
J. D. Graham et. al., "Shiva Star—Marauder Compact Torus System," Digest of Technical Papers, 8th IEEE International Pulsed Power Conference, Jun. 1991 pp. 990-993.
T.K. Fowler, "Pulsed Spheromak Fusion Reactors", Comments on Plasma Physics & Controlled Fusion, Comments on Modern Physics, vol. 1(3), Part C, Jun. 1999, pp. 83-98.
T.K. Fowler, "Pulsed Spheromak Reactor With Adiabatic Compression", Lawrence Livermore National Laboratory, Mar. 29, 1999, in 13 pages.

T.K. Fowler, "Stability of Spheromaks Compressed by Liquid Walls", Lawrence Livermore National Laboratory, Aug. 17, 1999, in 9 pages.
J. H. Hammer et al, "Experimental demonstration of acceleration and focusing of magnetically confined plasma rings", Physical Review Letters, Dec. 19, 1988, vol. 61, Issue 25, pp. 2843-2846.
C. W. Hartman et al, "Acceleration of Spheromak Toruses, Experimental results and fusion applications", OSTI ID: 5240480; DE90005312, Proceedings of 11th US/Japan workshop on field-reversed configurations and compact toroids; Nov. 7-9, 1989, Dec. 1, 1989, Los Alamos, NM, USA.
C.W. Hartman et al., "Acceleration of Compact Toruses and Fusion Applications", Workshop on Physics of Alternative Magnetic Confinement Schemes, UCRL-JC-106121 Preprint, Oct. 11, 1990, Issue UCRL-JC-106121 Prepr, Varenna, Italy.
C. W. Hartman et al., "Acceleration of Compact Toroid Plasma Rings for Fusion Applications," Lawrence Livermore National Laboratory, UCRL-98504, Prepared for Submittal to IAEA 12th International Conference on Plasma Physics and Controlled Nuclear Fusion Research in Nice, France, Oct. 12-19, 1988, in 16 pages.
C.W. Hartman et al., "Acceleration of Compact Torus Plasma Rings in a Coaxial Rail-Gun", 7th Symposium on Compact Toroid Research, Santa Fe, New Mexico, May 21-23, 1985, in 6 pages.
D.N. Hill et al., "Field and Current Amplification in the SSPX Spheromak", 19th IAEA Fusion Energy Conference, Oct. 8, 2002, in 8 pages.
S. Howard et al., "Development of merged compact toroids for use as a magnetized target fusion plasma", Journal of Fusion Energy, Nov. 11, 2008, vol. 28, No. 2, pp. 156-161, available Jun. 2008.
S.C. Hsu et al, "On the Jets, Kinks, and Spheromaks Formed by a Planar Magnetized Coaxial Gun", California Institute of Technology, Pasadena, CA 91125, Feb. 2, 2008, pp. 1-16.
R.C. Kirkpatrick, "Assessment of the Acoustically Driven MTF Experiments being conducted by Dr. Michel Laberge of General Fusion, Inc.," May 2007, in 3 pages.
Thomas W. Kornack, "Magnetic Reconnection Studies on SSX", Swarthmore College Department of Physics and Astronomy, Swarthmore, PA, USA, Jun. 10, 1998, pp. 2-56.
Michel Laberge, "Acoustic Wave Driven MTF Fusion Reactor," Mar. 2007, in 20 pages.
Michel Laberge, "An Acoustically Driven Magnetized Target Fusion Reactor," Journal of Fusion Energy, vol. 27, Nos. 1-2, Jul. 11, 2007, pp. 65-68.
Michel Laberge, "Evidence of Fusion Products in Acoustically Driven MTF," Mar. 2007, in 41 pages.
Michel Laberge, "Experimental Results for an Acoustic Driver for MTF," Journal of Fusion Energy, Jun. 2009, vol. 28, Nos. 2, pp. 179-182, available Jun. 2008.
D. Liu et al., "Bench Test and Preliminary Results of Vertical Compact Torus Injection Experiments on the STOR-M Tokamak", Nuclear Fusion 46 (006), Dec. 16, 2005, pp. 104-109.
Ch. Mangeant et al., "Syrinx Project: Compact Pulse-Current Generators Devoted to Material Study Under Isentropic Compression Loading", in Pulsed Power Plasma Science, IEEE, Jun. 2001, in 4 pages.
T. E. Markusic et al., "Visualization of Current Sheet Canting in a Pulsed Plasma Accelerator", IEPC-99-206, 26th International Electric Propulsion Conference in Kitakyushu, Japan, Oct. 17-21, 1999, in 8 pages.
H. S. McLean et al, "Design and operation of a passively switched repetitive compact toroid plasma accelerator", Fusion Technology, May 1998, vol. 33, pp. 252-272.
D.J. Meeker et al., "A High Efficiency I.C.F. Driver Employing Magnetically Confined Plasma Rings", Lawrence Livermore National Laboratory, Sixth Topical Meeting on the Technology of Fusion Energy, San Francisco, California, Mar. 3-7, 1985, in 8 pages.
R. L. Miller and R. A. Krakowski, "Assessment of the slowly-imploding liner (Linus) fusion reactor concept", Los Alamos Scientific Laboratory, Oct. 1980, Issue Rept. No. LA-UR-80-3, Los Alamos, NM, USA, in 10 pages.

(56) References Cited

OTHER PUBLICATIONS

J. Miyazawa et al., "Design of Spheromak Injector Using Conical Accelerator for Large Helical Device", Fusion Engineering and Design 54 (2001), pp. 1-12.

R. W. Moir et al., "HYLIFE-II: An approach to a long-lived, first-wall component for inertial fusion power plants", Lawrence Livermore National Lab, Aug. 1, 1994, vol. Report No. UCRL-J, Issue CONF-940933-46, in 15 pages.

G. Olynyk et al., "Development of a Compact Toroid Fuelling System for ITER", Nuclear Fusion, vol. 48, No. 9, Sep. 2008, in 11 pages.

G. M. Olynyk, "Design and evaluation of a repetitive-fire compact toroid fuelling system for ITER," thesis submitted to the Department of Physics, Queen's University, Ontario, Canada, Mar. 2007, in 48 pages.

R. E. Peterkin, Jr. , "Direct electromagnetic acceleration of a compact toroid to high density and high speed", Physical Review Letters, Apr. 17, 1995, vol. 74, Issue 16, pp. 3165-3168.

V. Suponitsky et al., "Richtmyer-Meshkov instability of a liquid-gas interface driven by a cylindrical imploding wave", Computers & Fluids, vol. 89, Jan. 20, 2014, in 19 pages.

V. Suponitsky et al., "An Overview of Computational Results at General Fusion Inc. with Focus on Hydrodynamics", Proceedings of CFD Society of Canada Conference, May 2012, in 9 pages.

V. Suponitsky et al., "On the Collapse of a Gas Cavity by an Imploding Molten Lead Shell and Richtmyer-Meshkov Instability", Proceedings of the 20th Annual Conference of the CFD Society of Canada, Canmore, Alberta, Canada, May 9-12, 2012, in 8 pages.

Kiuttu, G.F., et al., "Acceleration and compression of compact toroid plasmas," 1994 10th International Conference on High-Power Particle Beams, IET, vol. 1, pp. 150-158, Jun. 1994.

Logan, B.G., et al., "Compact Torus Accelerator Driven Inertial Confinement Fusion Power Plant HYLIFE-CT," Lawrence Livermore National Laboratory, UCRL-TR-211025, Apr. 1, 2005, in 85 pages.

N. M. Schnurr et. al., "An Analytical Investigation of the Impingement of Jets on Curved Deflectors", AIAA Journal, vol. 10, No. 11, Nov. 1972, in 41 pages.

\* cited by examiner

1

APPARATUS FOR ACCELERATING AND COMPRESSING PLASMA

CROSS-REFERENCE TO RELATED APPLICATIONS

This application is a U.S. National Phase of International Application No. PCT/CA2013/050670, filed Aug. 29, 2013, entitled "APPARATUS FOR ACCELERATING AND COMPRESSING PLASMA," which claims the benefit under 35 U.S.C. §119(e) of U.S. Provisional Patent Application No. 61/694,550, filed Aug. 29, 2012, entitled "HIGH EFFICIENCY PLASMA ACCELERATOR," each of which is hereby incorporated by reference herein in its entirety.

TECHNICAL FIELD

The present disclosure generally relates to a method and system for plasma acceleration and compression and more particularly relates to a high efficiency plasma accelerator and a method for accelerating plasma.

BACKGROUND

Plasma is a state of matter similar to gas in which at least part of the particles are ionized. The presence of charged particles (e.g. positive ions and negative electrons) makes plasma electrically conductive. A plasma torus is a self-sustained magnetized plasma shaped into a toroidal configuration, with linked poloidal and toroidal (in some cases) closed magnetic fluxes. The extent of linkage of the poloidal and toroidal magnetic fluxes defines a helicity of the plasma torus. Plasma torus contained in a simply connected volume is called a compact toroid (CT). The CT configuration can include, for example: (i) a spheromak configuration that exists close to a stable magnetohydrodynamic equilibrium with an internal magnetic field having both toroidal and poloidal components; or (ii) a Field Reversed Configuration (FRC), which also has a toroidal magnetic topology, but can be more elongated in the axial direction with an outer surface being similar to a prolate ellipsoid, and which has primarily a poloidal magnetic field, with no toroidal magnetic field component. CT plasmas can be formed in a range of magnetic configurations, including ones that exist in states that are in between spheromak and FRC states. It is also possible for an initial plasma torus to evolve and change its magnetic configuration during time.

SUMMARY

According to one aspect, a plasma acceleration and compression device is provided. The device comprises a plasma accelerator for accelerating and compressing a plasma torus and a power source for providing an electrical acceleration pulse to the accelerator that produces a current that flows in the accelerator and generates a magnetic pushing flux behind the plasma torus that is sufficient to accelerate and compress the plasma torus throughout the accelerator.

The accelerator has a tubular outer electrode and a tubular inner electrode extending inside the outer electrode, wherein the outer and inner electrodes define an annular plasma propagation channel for accelerating and compressing a plasma torus therethrough. The plasma propagation channel has an inlet end for receiving the plasma torus from a plasma generator and an outlet end for discharging the plasma torus that has been accelerated and compressed inside the annular channel. The plasma propagation channel has a lengthwise elongated section with an upstream end in fluid communication with the inlet and a downstream end in fluid communication with the outlet. A cross-sectional annular gap defined as a radial distance between the inner and outer electrodes decreases non-linearly in a downstream direction along the length of the elongated section. The apparatus is configured to have a sufficient inductance before the elongated section that the plasma torus is accelerated and compressed throughout the elongated section by an expansion of the magnetic pushing flux. The dimensions of the plasma propagation channel are selected such that for a selected inductance of the elongated section and selected inductance before the elongated section, the current flowing in the elongated section at the downstream end is smaller than at the upstream end of the elongated section and a plasma torus pressure is greater at the downstream end of the elongated section than at the upstream end of the elongated section. The elongated section can be configured to have a plasma torus radial compression ratio of between 1 and 2.

The plasma propagation channel can further comprise a high compression funnel section between the inlet and the upstream end of the elongated section. The funnel section comprises an upstream end in fluid communication with the inlet and a downstream end in fluid communication with the upstream end of the elongated section. A cross-sectional annular gap in the funnel section defined as a radial distance between the inner and outer electrodes decreases in a downstream direction along the length of the funnel section. Further, the funnel section can be configured to have a radial compression ratio of between 3 and 10.

The elongated section can have a fixed ratio of inner electrode and outer electrode radiuses. The radius $r(z)$ of one of the inner or outer electrodes along a lengthwise position $z$ of the elongated section can be defined by the equation:

$$\frac{1}{r(z)} = a - \frac{b}{1 + c(z - z_0)}$$

wherein $z_0$ is a lengthwise position of the elongated section at the upstream end, $c$ is a ratio of inductance per unit length $L'$ of the elongated section to inductance $L_0$ before the elongated section, and $a$ and $b$ are constants defined by:

$$a = b + 1/r_0$$

wherein $r_0$ is the radius of the inner or outer electrode at the upstream end, and $$b = \frac{\frac{1}{r_1} - \frac{1}{r_0}}{1 - \frac{1}{1 + c(z_1 - z_0)}}$$

wherein $r_1$ and $z_1$ are the respective radius of the inner or outer electrode and the lengthwise position of the elongated section at the downstream end.

Alternatively, the radiuses of the inner and outer electrodes are not in a fixed ratio relative to each other. In such cases, the radius $r(z)$ of each of the inner and outer electrodes along a lengthwise position $z$ of the elongated section is separately defined by the equation:

$$\frac{1}{r(z)} = a - \frac{b}{1 + c(z - z_0)}$$

wherein $z_0$ is a lengthwise position of the elongated section at the upstream end, c is the ratio of inductance per unit length L' of the elongated section to inductance $L_0$ before the elongated section, and a and b are constants defined by:

$$a = b + 1/r_0$$

wherein $r_0$ is the radius of the inner or outer electrode at the upstream end, and $$b = \frac{\frac{1}{r_1} - \frac{1}{r_0}}{1 - \frac{1}{1 + c(z_1 - z_0)}}$$

wherein $r_1$ and $z_1$ are the respective radius of the inner or outer electrode and the lengthwise position of the elongated section at the downstream end.

The power source can be configured to generate an electrical acceleration pulse that stops once the plasma torus enters the elongated section. The power source can also be configured to generate an electrical acceleration pulse with a timing, duration and current amplitude that results in a constant pushing flux when the plasma torus travels along the elongated section.

According to another aspect, there is provided a system comprising the plasma acceleration and compression device as defined above, and a plasma generator comprising a tubular outer electrode and a tubular inner electrode extending inside the outer electrode to define an annular plasma formation channel therebetween. The outer electrode of the accelerator is physically connected to the outer electrode of the plasma generator, and the annular plasma formation channel is aligned and in fluid communication with the annular plasma propagation channel. The system can further comprise a plasma torus relaxation region defined by an inner wall of the outer electrode and a space between the upstream end of the accelerator inner electrode and a downstream end of the plasma generator inner electrode. The relaxation region is in fluid communication with the plasma formation channel and the plasma propagation channel. The relaxation region can comprises an inward expansion zone formed at the upstream end of the accelerator inner electrode. Alternatively, the relaxation region can comprise an outward expansion zone formed at the upstream end of the accelerator at the outer electrode.

BRIEF DESCRIPTION OF THE DRAWINGS

Sizes and relative positions of elements in the drawings are not necessarily drawn to scale. For example, the shapes of various elements and angles are not drawn to scale, and some of these elements are arbitrarily enlarged and positioned to improve drawing legibility.

DETAILED DESCRIPTION

Figure 1A:
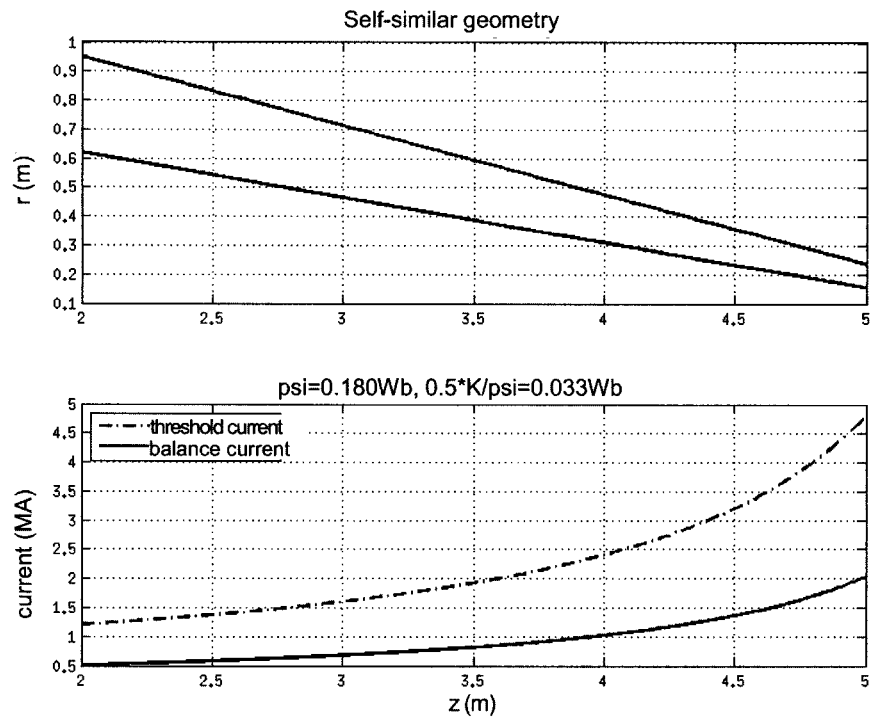
FIG. 1A (PRIOR ART) are graphs of a simulated embodiment of a known system for plasma acceleration and compression having a plasma propagation channel with a constant taper geometry. An upper graph shows the geometry (radius vs. axial length) of an annular axially extending plasma propagation channel of the accelerator, wherein the upper curve shows the geometry of an outer electrode and the lower curve shows the geometry of an inner electrode. A lower graph shows a balance current $I_{bal}$ (solid curve) and a current threshold $I_{lift}$ (dot-dashed curve) along the length of the plasma propagation channel in the accelerator.

One example of a known system for plasma acceleration and compression is a two-stage magnetized Marshall gun. In the first stage the plasma torus can be formed by discharging a capacitor bank across a pair of coaxial electrodes, with a radial magnetic field providing the initial magnetization of the plasma. In the second stage, a capacitor bank is discharged in a taper coaxial accelerator with the plasma torus as an armature, wherein the accelerator has a pair of coaxially aligned tubular inner and outer electrodes that define an annular channel with a constant taper geometry, i.e. the channel has an annular gap (distance between the radiuses of the inner and outer electrodes) that decreases linearly along the length of the channel. The current J interacts with the magnetic field B generated by the current and the magnetic (Lorentz) force J×B accelerates and compresses the plasma torus down the acceleration annular channel.

Another example of a known accelerating and compressing system is a RACE system (Ring Accelerator Experiment, at Lawrence Livermore National Laboratory) that uses gun geometry where a long coaxial cylindrical acceleration region with a constant annular gap (no compression) is followed by a converging, focusing section with a constant taper geometry in which plasma is compressed. In most applications of this class of device, the final kinetic energy of the plasma torus is rapidly dumped into a pulse of radiation as the plasma torus is brought to rest in a final impact region.

Another example of a known accelerating and compressing system is a MARAUDER system (Magnetically Accelerated Rings to Achieve Ultrahigh Directed Energy and Radiation, at Air Force Phillips Laboratory in Albuquerque, N. Mex.). The MARAUDER device comprises a pre-compressing cone with a constant taper geometry followed by a long constant gap accelerator.

In certain systems where the plasma can be accelerated and simultaneously compressed using a coaxial accelerator with an annular channel having a constant taper geometry, an acceleration pulse applied to the accelerator from a power source must be configured to produce a pushing current in the accelerator that increases along the length of the channel and is highest when the plasma torus reaches the downstream end of the plasma accelerator, since to push and compress the plasma torus through a linearly decreasing annular gap of the channel, the pushing current must overcome an increasing magnetic pressure of the torus (a reverse force). When the plasma torus leaves the accelerator and enters a flux conserving chamber (e.g. a target chamber), a significant amount of the current can remain circulating in the accelerator. Experiments with certain prototypes of a plasma accelerator that are under construction at General Fusion, Inc. (Burnaby, Canada) have indicated that this circulating current may influence the lifetime of the plasma torus in the target chamber. Some fraction of this circulating current may flow on open field lines that can run through the center of the plasma torus. The influx of magnetic energy from the accelerator into the target chamber may typically be accompanied by an influx of relatively cold plasma particles, which act to cool the relatively hot plasma torus. The dynamics of this interaction between linked current and the plasma torus was described by R. C. Duck et. al., "Structure of the n=1 mode responsible for relaxation and current drive during sustainment of the SPHEX spheromak", Plasma Phys. Control. Fusion, vol. 39, pp. 715-736, May 1997.

The experiments at General Fusion Inc. have further shown that it can be hard, in some cases, to remove a magnetic pushing flux once it has been injected into the plasma accelerator. It is known that applied voltage is a rate of change of a total magnetic flux in the accelerator; however, application of a reverse voltage does not reverse the flow of flux and it has been observed that a negative flux may not immediately cancel the positive flux. Instead, a current sheet can form in the internal plasma resulting in separated positive and negative flux regions. As a result, a net flux is diminished; however, the pushing current actually increases.

Accordingly, it is desirable to provide a system and/or method for operating the system that compresses and accelerates a plasma torus out of an accelerator with a reduced amount of pushing current at the outlet end of the accelerator and particularly with a pushing current that is smaller at the outlet end than at the inlet end of the accelerator.

Before discussing specific embodiments of such improved systems and/or methods, it is useful to consider the following principles governing compression and acceleration of a plasma torus. A simple model of compression in an accelerator is based on the approximation that the energy of the plasma torus behaves similarly to that of a Taylor state. A Taylor state is a force free plasma configuration with $$\nabla \times \underline{B} = \lambda \underline{B} \quad (1)$$

where $\underline{B}$ is a magnetic field of the plasma torus and $\lambda$ is an eigenvalue that describes the plasma torus in its lowest energy state. In a case of a plasma torus that is accelerated in a coaxial rail gun, $\lambda$ is a function of a lengthwise position z of the plasma torus in a plasma propagation channel of the rail gun.

The energy $\underline{U}$ of the Taylor state is $$U = \frac{K\lambda}{2\mu_0} \quad (2)$$

where $\mu_0$ is the magnetic permeability of a vacuum ($4\pi \times 10^{-7}$ N/A$^2$) and K is a magnetic helicity of the plasma torus, where K is given by $$K = \int dV \underline{A} \cdot \underline{B} \quad (3)$$

where $\underline{A}$ is a magnetic vector potential that is function of the position of the plasma torus and V is a volume of the plasma torus.

From the Taylor state it can be assumed that the energy of the plasma torus is proportional to the $\lambda$ for a plasma torus at position z:

$$U\lambda(z) \quad (4)$$

where $$\lambda = \frac{\pi}{\Delta r(z)}$$

and the helicity of the plasma torus is a conserved quantity.

For a coaxial accelerator having an annular plasma propagation channel defined by a pair of coaxially aligned tubular electrodes, namely an outer electrode with an outer radius $r_{outer}$ and an inner electrode having an inner radius $r_{inner}$, the change in the annular gap $\Delta r$ in the annular propagation channel as a function of axial position z along the plasma propagation channel can be defined as $\Delta r(z) = r_{outer} - r_{inner}$. A force that balances the plasma torus at a given axial lengthwise position in the channel is proportional to $d\lambda/dz$, where $\lambda(z)$ is an eigenvalue that describes the plasma torus when it is at axial lengthwise position z in the channel.

When a power source electrically coupled to the accelerator applies an electrical pulse to the accelerator, a pushing current flows across the electrodes in the accelerator, namely across one of the electrodes, across the annular gap via the plasma torus, across the other electrode and back to the power source. An applied pushing force required to drive the plasma torus down the accelerator ($F_{push}$) can be determined by integrating a magnetic pressure due to the pushing current over the back (upstream) side of the plasma torus and can be expressed by the equation:

$$F_{push} = \frac{1}{2} I^2 \frac{dL(z)}{dz} \quad (5)$$

where I is the pushing current (at the back of the torus) and L(z) is an inductance of the pushing current loop (the current path along the electrodes and across the gap) when plasma torus is at a lengthwise position z along the channel. The inductance per unit length L'≡dL(z)/dz of the channel is thus given by $$L' = \frac{\mu_0}{2\pi} \ln \frac{r_{outer}}{r_{inner}} \quad (6)$$

for a coaxial accelerator with an outer radius $r_{outer}$ and an inner radius $r_{inner}$ which for a taper geometry are functions of the position z of the plasma torus. "Taper geometry" refers to a coaxial accelerator having an annular plasma propagation channel with an annular gap that decreases in a downstream direction along the length of the channel. For an annular plasma propagation channel having a constant ratio of outer radius $r_{outer}$ to the inner radius $r_{inner}$, the inductance per unit length L' is a constant.

To move the plasma torus forward, the pushing force must overcome a reverse force exerted on the plasma torus by the tapering walls of the accelerator plasma propagation channel. The value of the reverse force can be found from a principle of virtual work defined as:

$$F_{wall}(z) = -\frac{dU(z)}{dz} \quad (7)$$

The reverse force $F_{wall}(z)$ is proportional to dλ/dz since it was assumed that energy of the plasma torus is $$U = \frac{K\lambda}{2\mu_0}$$

with a constant K.

A balance current $I_{bal}$ is defined as a current in the accelerator which produces a pushing force $F_{push}$ that is equal to the reverse force $F_{wall}$ such that the net force is zero ($F_{push}+F_{wall}=0$) and is given by $$I_{bal}(z) = \frac{1}{\mu_0} \sqrt{\frac{2\pi K}{\ln\left(\frac{r_{outer}}{r_{inner}}\right)} \frac{d\lambda}{dz}} \quad (8)$$

Hence, for a plasma torus to be accelerated forward down the plasma propagation channel of the accelerator, the applied current from the acceleration pulse must be larger than the balance current ($I>I_{bal}$).

In addition, the power source may be configured with parameters to produce an acceleration pulse that reduces the likelihood of or avoids a "blow-by" effect in the plasma propagation channel. A blow-by can occur when the magnetic pressure of the pushing current lifts the plasma torus from the inner electrode, allowing flux to expand ahead of the torus. This effect is called "static blow-by" and is different from a Rayleigh-Taylor blow-by that can occur when one tries to give the plasma torus too high an acceleration. When the plasma torus is not accelerating it will be lifted from the inner electrode if $$\frac{B_{push}^2}{2\mu_0} > \frac{B_{max}^2}{2\mu_0},$$

where $B_{push}$ is a magnetic field of the pushing current at the inner conductor (inner electrode of an accelerator) and $B_{max}$ is a maximum magnetic field of the plasma torus at the inner conductor.

$B_{push}$ is a function of a radius of the inner electrode which is a function of a lengthwise position z of the plasma torus in the channel and of the applied current.

$$B_{push(z)} = \frac{\mu_0}{2\pi r_{inner}(z)} I \quad (9)$$

A maximum magnetic field of the plasma torus at the inner electrode is given by $$B_{max}(r_{inner}) = \frac{\psi}{\mu_0(\bar{r}^2 - r_{inner}^2)} \quad (10)$$

where ψ is a poloidal flux of the plasma torus and $$\bar{r} = \frac{(r_{outer} + r_{inner})}{2}.$$

The pushing field is at a maximum at the inner conductor and is given by $2\pi r_{inner} B_{push} = \mu_0 I$ and thus a threshold current for blow-by is $I_{lift} = 2\pi r_{inner} B_{push}/\mu_0$. A threshold current for blow-by $I_{lift}$ is defined as the current when $B_{push}=B_{max}$ and is defined as $$I_{lift} = \frac{2\pi \psi r_{inner}}{\mu_0^2(\bar{r}^2 - r_{inner}^2)} \quad (11)$$

Hence, in a static case, to reduce the likelihood of or avoid blow-by, the pushing current should be lower than the threshold current ($I<I_{lift}$).

An upper plot shown in FIG. 1A (PRIOR ART) illustrates an example of a known plasma acceleration and compression system having a plasma propagation channel with a constant taper geometry (i.e. a channel having an annular gap that linearly decreases in a downstream direction along the length of the channel); the upper curve in this plot shows the geometry of an outer electrode and the lower curve shows the geometry of an inner electrode. A lower plot shown in FIG. 1A illustrates an example of current flowing in the system of FIG. 1A, and more particularly, shows a balance current $I_{bal}$ in the accelerator (solid curve) as a function of the axial lengthwise position of the torus in the plasma propagation channel, and a current threshold for static blow-by $I_{lift}$ of the accelerator as a function of the axial lengthwise position of the plasma torus in the plasma propagation channel (dot-dashed curve). As can be seen in the known system with a constant taper geometry, the current required to drive the plasma torus forward is at a maximum when the plasma torus is at the downstream end of the system.

Figure 1B:
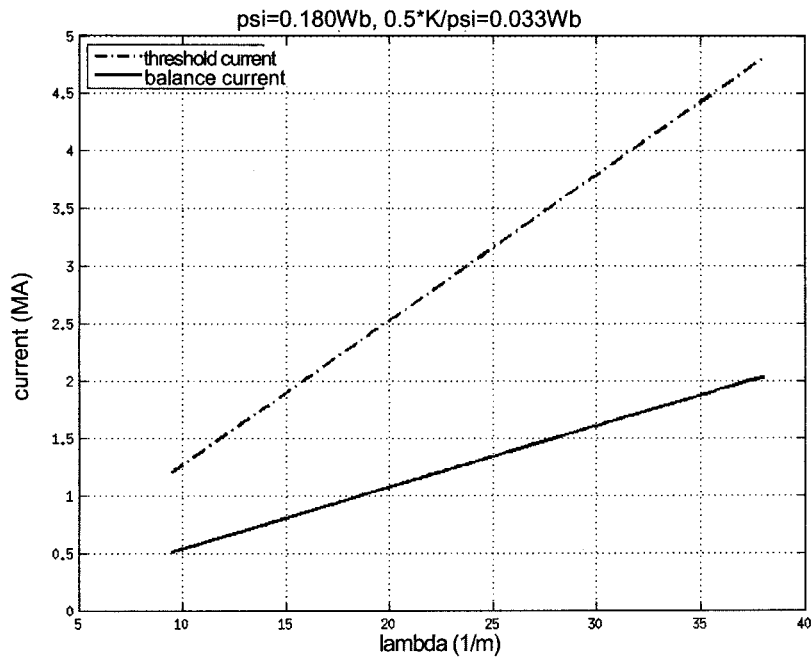
FIG. 1B (PRIOR ART) is a graph of a pushing current (in Mega Amperes, MA) as a function of λ (lowest energy state) of a plasma torus along the length of the annular channel of the accelerator of FIG. 1A, wherein the solid line is the balance current and the dashed line is the threshold current.

FIG. 1B shows an example of balance current (solid curve) and threshold current (dot-dashed curve) as a function of λ (wherein λ=2π/Δr(z)) of the plasma torus of the accelerator shown in FIG. 1A. As can be seen in an accelerator with a constant taper geometry, as the plasma torus is accelerated down the accelerator's plasma propagation channel, the minimum current required to push the plasma torus ($I_{bal}$) increases along the length of the channel such that the pushing current is highest at the downstream end of the accelerator when the plasma torus is at a maximum compression (has its highest λ).

Present embodiments of a plasma compression and acceleration system are designed so that the plasma torus can arrive at the outlet of the accelerator with a relatively small pushing current behind it and with a maximum compressed plasma torus. The pushing current at the outlet of the accelerator should be smaller than at the inlet of the accelerator but still provide acceleration and compression of the plasma torus throughout the accelerator.

Embodiments of an improved plasma compression system will now be described with reference to FIGS. 2 to 9. These embodiments include an accelerator having coaxially aligned tubular inner and outer electrodes that define an annular plasma propagation channel comprising a high compression section and a mild compression elongated section downstream of the high compression section and having a geometry that reduces the amount of pushing current required to complete the acceleration and compression of a plasma torus through the accelerator. More particularly, the annular propagation channel in the elongated section has a cross-sectional annular gap (defined as the radial distance between the inner and outer electrodes) which decreases non-linearly in a downstream direction along the length of the channel. The system also includes a plasma generator and a power source electrically coupled to the plasma generator and accelerator and which provides an electrical plasma formation pulse to the plasma generator and an electrical acceleration pulse to the accelerator. The power source is configured to produce an acceleration pulse that will push the plasma torus to the end of the mild compression elongated section so that the pushing current at a downstream end of the elongated section is smaller than at the upstream end of the elongated section. For example, in some implementations, the power source is configured so that when the plasma torus enters the elongated section no additional pushing flux is added to the system once the plasma torus passes a certain point in the elongated section. In other implementations, the power source is configured to produce an acceleration pulse that provides additional pushing flux to complete the acceleration and compression of the plasma torus, and this pushing flux may be, for example, less than 5%, less than 10%, less than 15%, or less than 25% of the pushing flux used to initially accelerate and compress the plasma torus in various implementations. The additional pushing flux, if applied, can be used to overcome drag in some such implementations.

Figure 2:
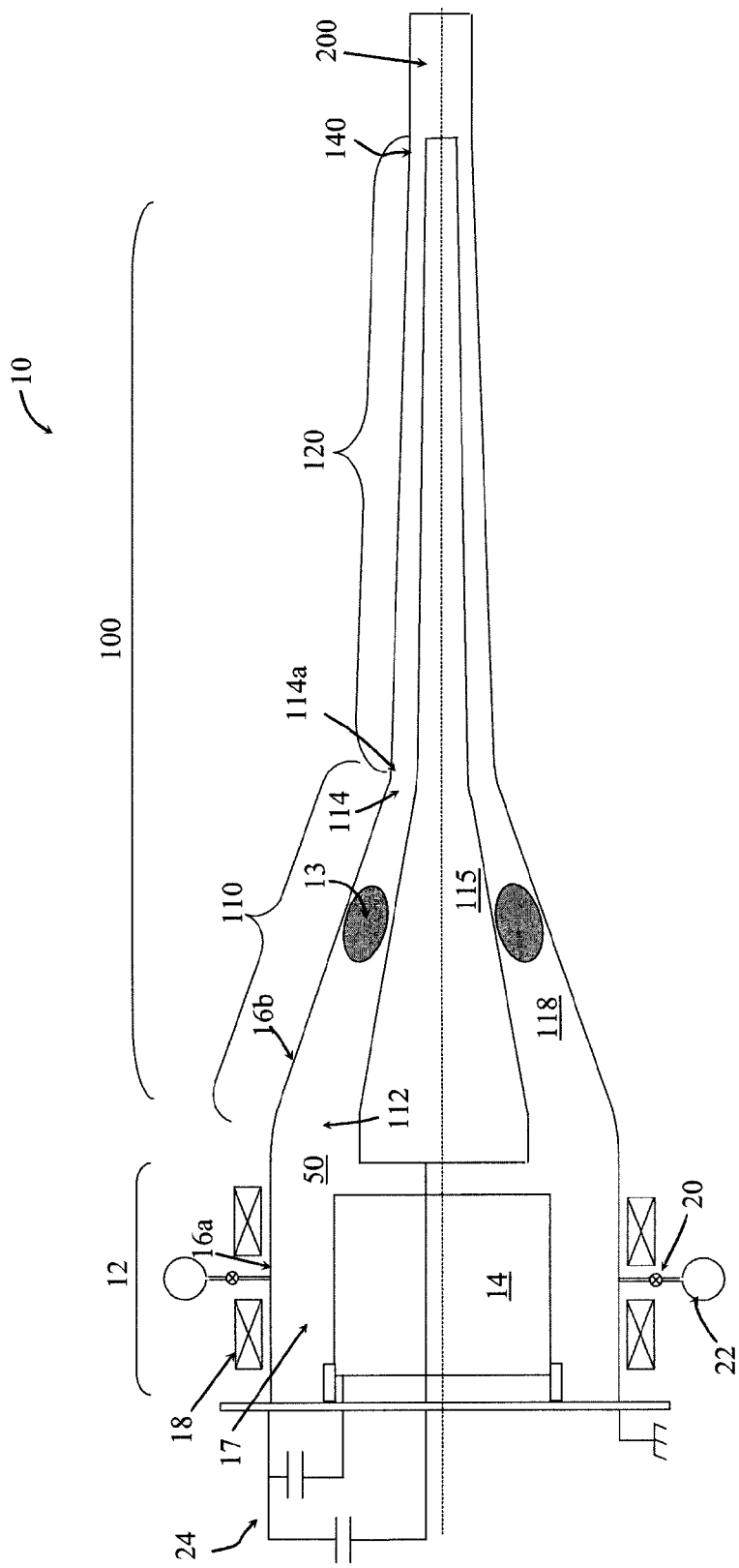
FIG. 2 is a schematic longitudinally sectioned view of one non-limiting embodiment of a plasma acceleration and compression system comprising a power source, a plasma generator, an accelerator with an annular plasma propagation channel comprising an elongated section having a non-linear decreasing annular gap and a relaxation region with an inward expansion zone.

Referring now to FIG. 2 and according to one non-limiting embodiment, a plasma acceleration and compression system 10 comprises an accelerator 100 with an inlet 112 and an outlet 140 downstream of the inlet 112, and an annular plasma propagation channel 118 extending between the inlet 112 and the outlet 140. The plasma propagation channel 118 comprises a high compression funnel section 110 having an upstream end in fluid communication with the inlet 112 and a mild compression elongated section 120 having an upstream end 114a in fluid communication with a downstream end 114 of the funnel section 110 and a downstream end in fluid communication with the outlet 140. The funnel section 110 has a conical, relatively steep tapering geometry that extends in a downstream direction from the inlet 112 and provides a relatively high compression rate to a magnetized plasma torus 13 passing therethrough. In this embodiment, the funnel section 110 has a constant taper geometry, i.e. have an annular gap that decreases linearly downstream along the length of the funnel section; however, the funnel section can alternatively have a varying taper geometry. The elongated section 120 is shaped to have a relatively gentler tapering than the funnel section 110. In the elongated section 120 the tapering is relatively gradual so that a relatively smaller compression of the plasma torus is achieved over a relatively longer section of the accelerator 100 when compared to the funnel section 110. The elongated section 120 is shaped to provide a gradual transition from the steep tapering of the funnel section 110. The upstream end 114a of the elongated section 120 can have a gradual corner geometry to reduce the non-adiabatic heating of the plasma torus that can happen with a more sharp transition. Further, the elongated section 120 has varying taper geometry, i.e. a cross-sectional annular gap of the channel in the elongated section 120 decreases non-linearly in a downstream direction along the length of the elongated section 120. This geometry, for a given inductance of the elongated section and inductance before the elongated section ("pre-inductance"), causes a pushing current from an acceleration pulse to be smaller at the outlet 140 than at the inlet 114a of the elongated section 120.

The system 10 further includes a plasma generator 12 and a flux conservation system 200 (e.g. a target chamber). The generator 12 is configured to generate a magnetized toroidal plasma 13 and includes a tubular inner, formation electrode 14, a tubular outer electrode 16a coaxial to and surrounding the inner formation electrode 14 to define an annular plasma formation channel 17 therebetween.

The generator 12 also comprises a series of magnetic coils 18 that extend around the outside of the outer electrode 16a. A gas injector is in gaseous communication with the annular plasma formation channel 17 and is operable to inject a precise quantity of gas into the channel 17 through a series of fast puff valves 20 of the injector that extend around the chamber (only two of which are shown in FIG. 2). Each of the fast puff valves 20 are in fluid communication with a gas reservoir 22 and are operable to provide a substantially symmetrical introduction of gas into the plasma generator 12. The system 10 further comprises a power source 24 which includes at least one capacitor bank and preferably two or more capacitor banks, and is operable to provide a current to the plasma generator 12 and the accelerator 100. The coils 18 are configured to provide a radial stuffing magnetic field for forming the plasma's poloidal field. The system 10 may further be at least partially evacuated by using a pumping system (not shown).

Figure 7:
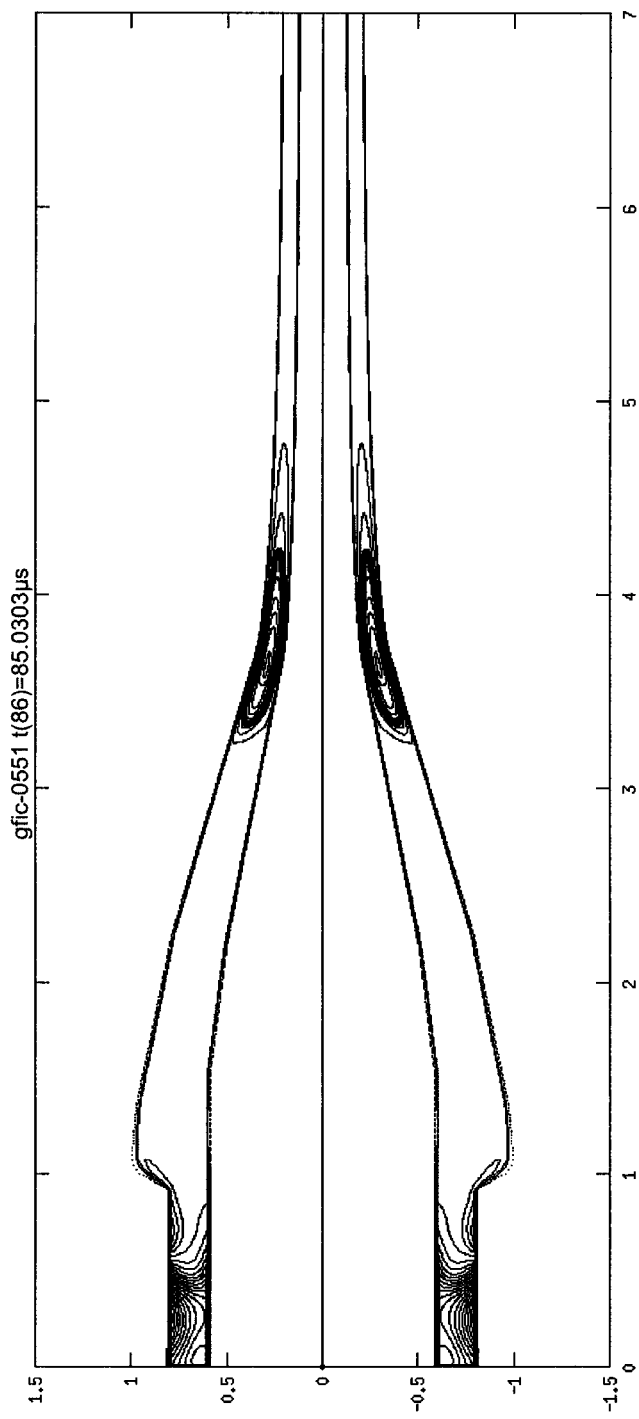
FIG. 7 is a longitudinally sectioned view of contours of a simulated polodial flux in an accelerator having a geometric profile according to another embodiment.

The shape of the annular plasma propagation channel 118 and its funnel and elongated sections 110, 120 are defined by a generally tubular inner electrode 115 and the generally tubular outer electrode 16b coaxial to and surrounding the inner electrode 115. The downstream end of the generator 12 is fluidly coupled to the accelerator inlet 112, i.e. with the upstream end of the funnel section 110. The interface of the generator and accelerator outer electrodes 16a, 16b and the downstream end of the plasma generator inner electrode 14 and the upstream end of the accelerator inner electrode 115 together define an open volume that serves as a relaxation region 50 for the plasma torus. In the illustrated example in FIG. 2, the diameter of the generator's inner electrode is larger than the diameter of the accelerator's inner electrode at the inlet 112 thereby creating an inward expansion zone of the relaxation region 50. When the plasma torus 13 formed in the generator 12 leaves the formation channel 17 and enters the relaxation region 50, the torus slightly expands and the magnetic field lines reconnect, so that the plasma torus can stabilize before the capacitor bank of the power source 24 provides a pulse to the accelerator 100 to accelerate and compress the plasma torus 13 from the accelerator inlet 112, down the accelerator 100 and towards the accelerator outlet 140. Alternatively, and as shown in FIG. 7, the relaxation region can be configured with an outward expansion zone as will be discussed in more detail below.

As noted above and as will be described in further detail below, the accelerator 100 is configured to provide simultaneous acceleration and compression of the plasma torus 13 so that the plasma torus arrives at the outlet 140 with maximum energy (maximum compression) and minimum pushing current behind it.

In one implementation, when the power source 24 is triggered to provide an electrical acceleration pulse to the accelerator, a pushing current flows from the power source 24 to the accelerator's inner electrode 115 ("acceleration electrode"), across the annular gap between the electrodes 115 and 16b through the plasma torus 13, and returns to the power source 24 via the outer electrode 16b, 16a. This pushing current generates an azimuthal magnetic field in the region between the electrodes 115, 16b. The magnetic field acts on the current to produce an electromagnetic J×B (Lorentz) pushing force, accelerating the plasma torus 13 down the conical funnel section 110.

The pushing current is selected to produce a pushing force that is greater than a reverse force (back-pressure) that is defined by the geometry of the plasma propagation channel 118, such that the plasma torus 13 will accelerate down the accelerator 100 and reach the outlet 140. Since the steepest taper of the plasma propagation channel is at the funnel section 110, the highest back-pressure exists in this part of the accelerator 100; the power source 24 is thus configured to produce an acceleration pulse that has a pushing current that generates a pushing force in the funnel section 110 that is high enough to overcome the back-pressure there as well as through the elongated section 120. Since the degree of taper of the plasma propagation channel 118 drops significantly at the elongated section 120, the power source 24 is configured to produce a maximum pushing current $I_{critical}$ when the plasma torus 13 enters the elongated section 120. At the upstream end 114a of the elongated section 120 a generated pushing flux $\Phi$ is defined by the $I_{critical}$ and an inductance $L_0$ of the system 10 before the elongated section 120 (at the upstream end 114a). Thus, the peak pushing current is at the downstream end 114 of the conical funnel section 110 and the upstream end 114a of the elongated section 120. Once the plasma torus 13 enters the elongated section 120 and starts travelling along it, little or no additional pushing flux needs to be injected into the accelerator. Once the power source 24 is discharged, it can be decoupled (short circuited by internal arc or insulators becoming conductive) from the system 10 and the current can flow in the system 10 in a loop.

The annular channel geometry of the elongated section 120 can be defined mathematically based on the following principles. In the elongated section 120 of the accelerator 100, the plasma torus 13 is compressed by the expansion of the pushing flux. The pushing current flowing in the accelerator 100 decreases as the plasma torus approaches the outlet end 140 of the accelerator 100 as a result of the increasing inductance in the elongated section 120. However, the pushing current behind the plasma torus 13 should still be large enough to overcome the increasing back-pressure (reverse force) due to the plasma torus compressing in the decreasing annular cross-section of the plasma propagation channel 118.

For accelerating the plasma torus 13 with a pushing flux $\Phi$ while the plasma torus 13 is in a force balance independent of its lengthwise position z in the plasma propagation channel 118, the function $\lambda(z)$ can be defined as a linear function of $1/L(z)$:

$$\frac{d\lambda}{dz} \propto \frac{dL^{-1}}{dz} \quad (12)$$

The linearity condition allows the total energy $K\lambda(z)/2\mu_0 + \Phi^2/2L(z)$ to be independent of the position (z) of the plasma torus for some value of helicity $K=K_0$. $K_0$ is a critical value of the helicity and can distinguish between a plasma torus at rest that will be accelerated forward if $K<K_0$ and a plasma torus that will be accelerated backwards if $K>K_0$.

By defining the applied current I(z) at a lengthwise channel position z as $I(z)=\Phi/L(z)$, where $\Phi$ is the pushing flux behind the plasma torus and L is the inductance in the elongated section 120 of the channel 118, a mathematic expression to define the shape (curve) of the elongated section 120 can be derived that enables the plasma torus 13 to be accelerated and compressed all the way to the downstream end of the elongated section (at the outlet 140) without adding any or very little additional flux into the accelerator 100.

When an inductance per unit length L' of the accelerating electrode in the section 120 is constant (i.e. independent of lengthwise channel position z), the inductance of the accelerator 100 is given by $$L(z)=L_0+(z-z_0)L' \quad (13)$$

where $L_0$ is the inductance (pre-inductance) of the pushing current loop before the elongated section 120 (when the plasma torus is at the first end 114a of the elongated section 120). $L_0$ can include the inductance of the preceding conical funnel section 110 and any additional inductance that should be included as part of the pushing current loop before the elongated section 120.

In cases where the ratio of the inner and outer electrode radius $r_{inner}$ and $r_{outer}$ of the accelerator 100 are constant, the inductance per unit length L' in the elongated section 120 is also constant, and the plasma torus entering the section 120 can move to the outlet 140 of the accelerator 100 with a constant pushing flux $\Phi=I(z) L(z)$. The shape of the elongated section 120 can be determined by the radius of either the inner or outer electrode 115, 16b, at the upstream end 114a ($r_0$, $z_0$) of the elongated section 120, a radius of the inner and outer electrodes 115, 16b at the outlet 140 ($r_1$, $z_1$), the inductance per unit length L' of the elongated section 120 and by the inductance $L_0$ before the elongated section 120, and is defined by the following mathematical equation:

$$\frac{1}{r(z)} = a - \frac{b}{1+c(z-z_0)} \qquad (14)$$

where c=L'/$L_0$, r(z) is either the inner or the outer electrode's radius at an axial lengthwise position z along the elongated section 120, $z_0$ is an axial position of the elongated section 120 at the upstream end 114a of the elongated section 120, and a and b are constants that can be determined by solving equation 14 at the upstream and downstream ends z=$z_0$ and z=$z_1$ (wherein $r_0$ and $r_1$ in the following equations denote the radius of the inner or outer electrode at the upstream and downstream ends, respectively):

$$\frac{1}{r_0} = a - b;\ a = b + \frac{1}{r_0};\ b = a - \frac{1}{r_0} \qquad (15)$$

$$\frac{1}{r_1} = b + \frac{1}{r_0} - \frac{b}{1+c(z_1-z_0)} \qquad (16)$$

$$\frac{1}{r_1} - \frac{1}{r_0} = b\left[1 - \frac{1}{1+c(z_1-z_0)}\right] \Rightarrow b = \frac{\frac{1}{r_1} - \frac{1}{r_0}}{1 - \frac{1}{1+c(z_1-z_0)}} \qquad (17)$$

Different possible geometric configurations of the elongated section 120 of the accelerator can be calculated using Equations 14-17 and the Versatile Advection Code magnetohydrodynamic simulation software (VAC; available from the University of Michigan). For example, the system 10 can be selected to have an elongated section geometry that has a constant ratio of the outer electrode radius to the inner electrode radius with the following parameters: a radius of the outer electrode 16 at the inlet 112 to be about 1 m, at the junction 114/114a (i.e. at the junction between the downstream end of the funnel section 110 and the upstream end of the elongated section 120) to be about 0.3 m; and at the outlet 140 to be about 0.2 m; a radius of the accelerating (inner) electrode 115 at the inlet 112 to be about 0.5 m at the junction 114/114a to be about 0.15 m, and at the outlet 140 to be about 0.1 m; the length of the conical funnel section 110 to be about 1.5 m; and the length of the elongated section 120 to be about 2.5 m. The calculated inductance per unit length L' in the section 120 (for given parameters) is about L'≅128 nH/m while the calculated pre-inductance $L_0$ is around 200 nH. In a simulation of the system 10 with the aforesaid parameters a parasitic pre-inductance is about 50 nH while its pre-inductance (inductance before the elongated section) is 151 nH which means that the total pre-inductance in the simulated system 10 is about 201 nH and is slightly larger than the calculated pre-inductance. Based on the above parameters, we find that a varying taper curve of the elongated section 120 can be defined from the equation (14) for a=11.1045 $m^{-1}$, b=4.2174 $m^{-1}$ and c=0.64 $m^{-1}$ in order for plasma torus to be accelerated and compressed all the way to the outlet 140 and the pushing current at the outlet 140 to be less than the pushing current at the first end 114a of the elongated section 120. The system with the mentioned parameters can for example, accelerate and compress a plasma torus with the following parameters: mass of the plasma torus of about $10^{-6}$ kg (e.g., a deuteron plasma with $3\times10^{20}$ ions per cubic meter); poloidal flux of the plasma torus about 0.18 Wb; a toroidal flux about 0.0324 Wb and helicity 0.0117 $Wb^2$. The dimensions and parameters of the accelerator and the plasma torus mentioned above are only for illustrative purposes and system with different dimensions/parameters can be designed to efficiently accelerate and compress various configurations of plasma torus so that the pushing current at the end of the accelerator is minimal while the plasma energy is maximal (maximum compression of the plasma torus).

In another embodiment, the inductance in the elongated section 120 varies along its length in which case the geometry of both the outer electrode 16 and the accelerating electrode 115 (along the elongated section 120) is determined separately using equations 14-17 by solving for the radius of the inner electrode and outer electrodes $r(z)_{inner}$ and $r(z)_{outer}$ along each lengthwise position along the elongated section 120.

Figure 3A:
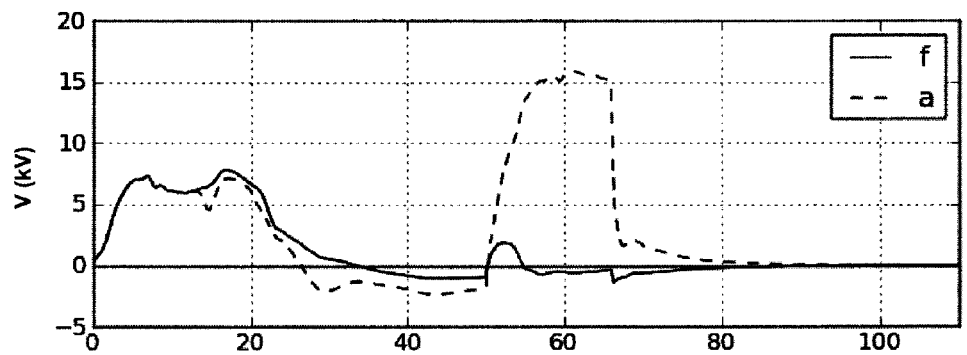
FIG. 3A is a graph of exemplary voltages (in kV) applied by the power source to the plasma generator and accelerator of FIG. 2, wherein the solid line shows a voltage of a plasma formation pulse applied to a formation region in the plasma generator and a dashed line shows a voltage of the acceleration pulse applied to the accelerator as a function of time (in μs).
Figure 3B:
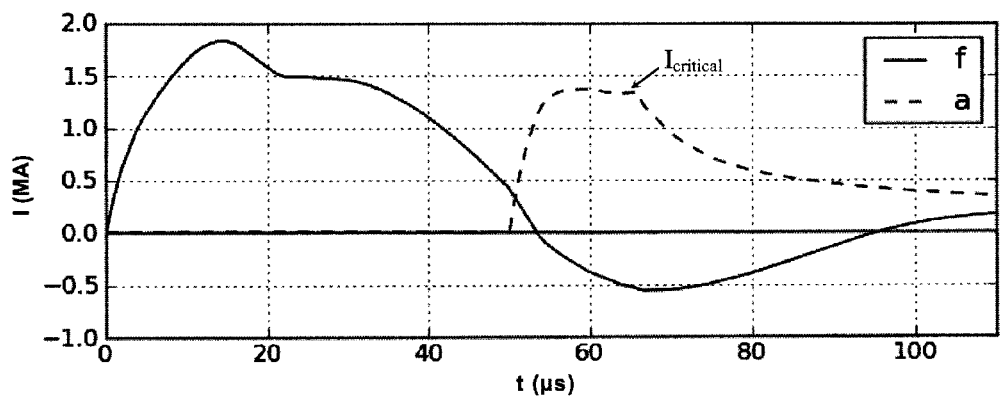
FIG. 3B is a graph showing a current (in MA) applied to the plasma generator (solid line) and accelerator (dashed line) shown in FIG. 3A.

The power source 24 is configured to generate a plasma formation pulse to the plasma generator that generates a plasma torus therein, and an electrical acceleration pulse to the accelerator 100 that generates a pushing current and a pushing flux therein that pushes the plasma torus through the accelerator 100 from the inlet 112 to the outlet 140. FIGS. 3A and 3B show the voltage and current profiles of suitable formation pulses (solid lines) and acceleration pulses (dashed lines). In particular, FIG. 3A illustrates an example of a voltage applied by the power source 24 to the plasma generator 12 (solid curve) and the accelerator 100 (dashed curve) as a function of time. As can be seen in these Figures, the acceleration pulse has a voltage of about 16 kV, a duration of about 20 μs, and is timed to apply the pulse when the plasma torus is in the relaxation region 50 at the inlet 112 (around 50 μs) and end when the plasma torus 13 enters the elongated section (around 70 μs). FIG. 3B illustrates an example of a current applied by the power source 24 to the plasma generator 12 (solid curve) and to the accelerator 100 (dashed curve) as a function of time. During the acceleration pulse (at a timing of 50 μs<t<70 μs), as the current ramps up towards its maximum level $I_{critical}$, the plasma torus 13 starts to move down the conical funnel section 110 wherein the plasma torus 13 is compressed. So, the plasma torus 13 gets compressed to some degree, increasing the plasma's magnetic field pressure and therefore preventing the pushing magnetic field from lifting the plasma torus 13 off the inner electrode 115 (preventing blow-by from occurring). The acceleration pulse is configured to provide a pushing current that is high enough to counteract the reverse force while continuing to push on the plasma torus 13 all the way to the beginning of the elongated section 120. The current peak is at the junction 114/114a of the funnel and elongated sections 110, 120, and not at the end of the accelerator (outlet end 140) like in prior plasma accelerators having a constant taper geometry (see FIG. 1A). Once the plasma torus 13 gets to the elongated section 120 and starts travelling along it, no additional flux needs to be injected into the accelerator 100 in this embodiment. The elongated section 120 can be so shaped to provide milder compression of the plasma torus 13 over a longer elongated section 120. As the plasma torus 13 moves downstream through the elongated section 120, the inductance (L) in the elongated section increases, so the pushing current (I) will decrease. The peak current as illustrated in FIG. 3B can be about 1.44 MA, while the pushing current flowing behind the plasma torus at the end of the elongated section 120 (at the outlet 140) has been decreased to about 0.5 MA, due to the increased inductance in the elongated section 120. Therefore, in this embodiment, the pushing current is at its highest when the plasma torus 13 is at the downstream 114 of the conical funnel compression section 110 of the accelerator 100.

Figure 4A:
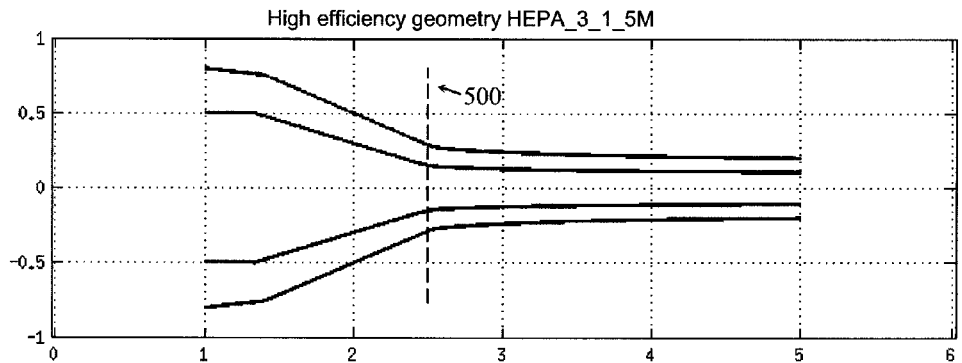
FIG. 4A is a schematic longitudinally sectioned view of one suitable geometry of the plasma propagation channel of the accelerator of FIG. 2.

The applicant has utilized MHD (magneto hydrodynamics) modeling using the VAC code to evaluate a performance of different designs of the plasma acceleration and compression system 10 and specifically different geometries of the conical funnel section 110 and the elongated section 120 to predict the efficiency of the accelerator 100 to accelerate and compress the plasma torus 13 to a high energy condition. FIG. 4A illustrates an example of a simulated operation of the plasma acceleration and compression system 10 of FIG. 2 showing the compression funnel section 110 and the elongated section 120 of the accelerator 100. A dashed vertical line 500 at lengthwise channel position z≈2.5 m indicates the junction 114/114a of the funnel section 110 and the elongated section 120. The length of the funnel section 110 was set at 1.5 m and the length of the elongated section was set at 2.5 m.

Figure 4B:
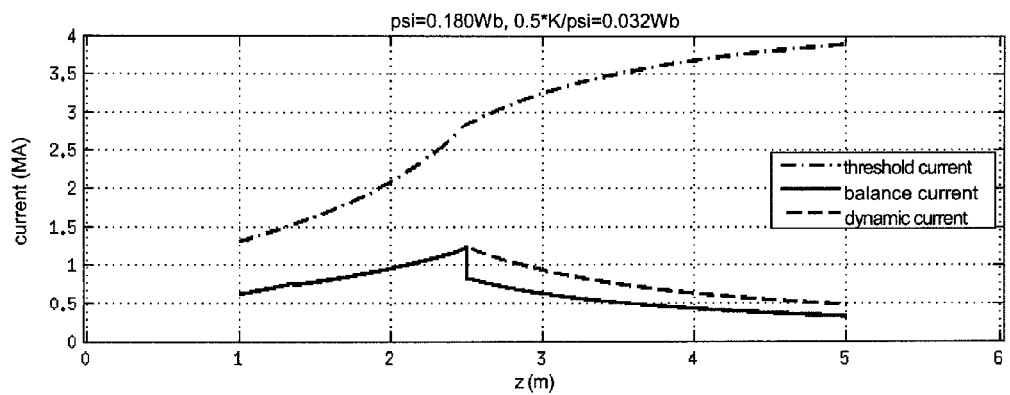
FIG. 4B is a graph of a threshold current, balance current, and dynamic current as a function of the axial lengthwise position in the accelerator shown in FIG. 4A, wherein the solid curve represents the balance current $I_{bal}$, the dot-dashed curve represents the current threshold $I_{lift}$ and the dashed curve represents the dynamic current.

FIG. 4B shows the threshold current, balance current and a dynamic current of the simulated system 10 of FIG. 4A wherein the balance current $I_{bal}$ is shown as a solid curve, the current threshold $I_{lift}$ for static blow-by to occur is shown as a dot-dashed curve, and a dynamic current behind the plasma torus is shown as a dashed curve. All currents are shown as functions of the position of the plasma torus along the length of the plasma propagation channel. The dynamic current curve represents the target pushing current to be produced by the power source to push the plasma torus throughout the accelerator. FIG. 4B shows only the dynamic curve present in the elongated section while the dynamic current present before the elongated section (in the funnel section) is omitted for clarity. The dynamic current is designed to be smaller than the threshold current to avoid blow-by, and larger than the balance current to account for various losses, such as flux loss, friction etc. By comparing the dynamic (pushing) current shown in the FIG. 4B with the dynamic (pushing) current shown in the FIG. 1A (lower plot) it can be noticed that the dynamic current at the outlet of the system 10 is much lower than the pushing current at the end of the accelerator with a constant taper geometry.

Figure 5:
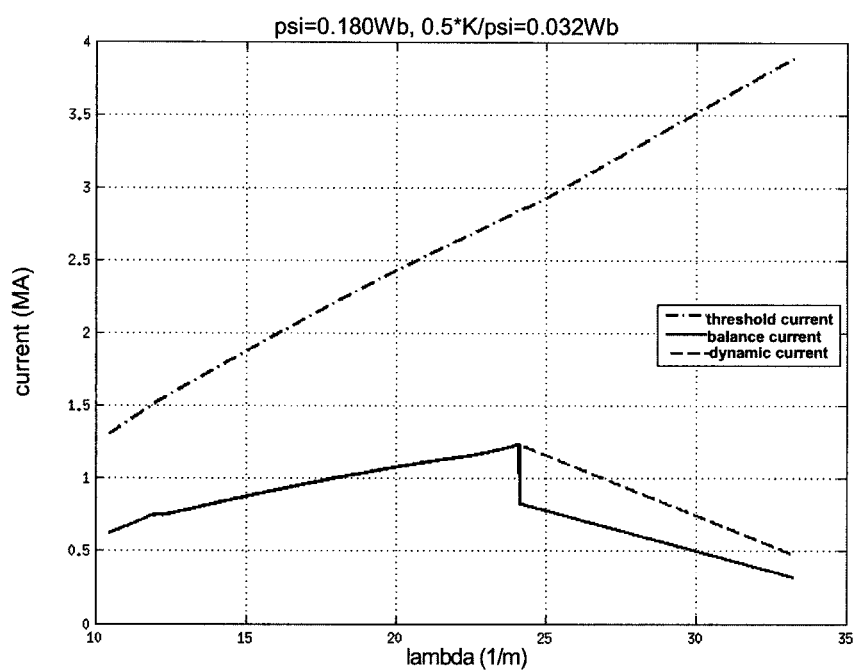
FIG. 5 is a graph of a threshold current, balance current, and dynamic current as a function of λ (lowest energy state) of a plasma torus in the accelerator shown in FIG. 4A, wherein the solid curve represents the balance current, the dot-dashed curve represents the threshold current and the dashed curve represents the dynamic current.

FIG. 5 illustrates an example of the threshold, balance and dynamic currents in a system having the parameters shown in FIG. 4A as function of λ. As can be seen, λ at the junction 114/144a of the funnel and elongated sections is about 24 $m^{-1}$ and the balance current at that point is maximum of about 1.2 MA, while at the end of the elongated section λ is significantly increased to a maximum value of about 33 $m^{-1}$ while the balance current value is about 0.4 MA which is significantly lower than at the end of the funnel section 110. This FIG illustrates that a maximum compressed plasma torus is pushed to the outlet 140 of the accelerator 100 with a minimum pushing current behind it.

Figure 6A:
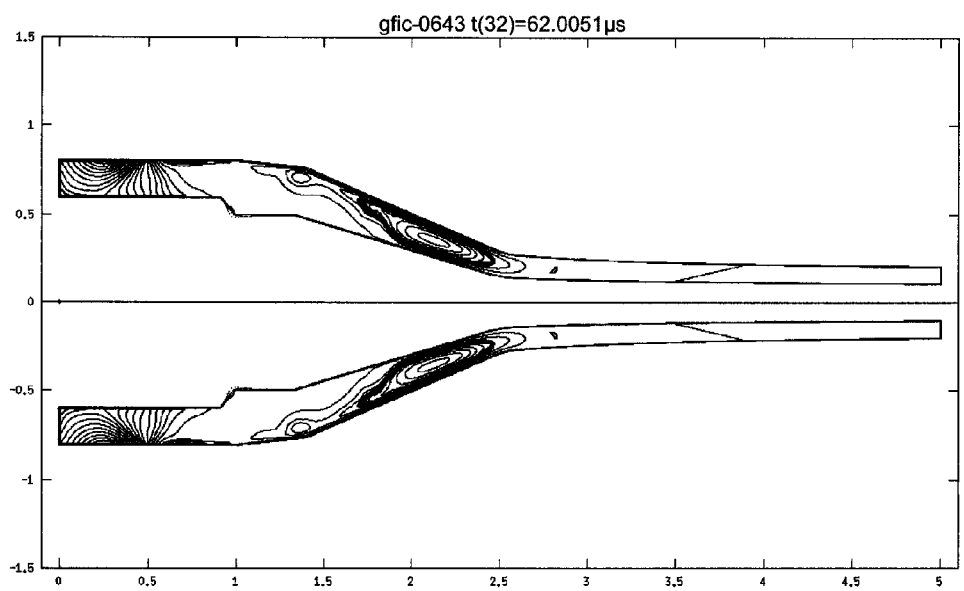
FIG. 6A is a longitudinally sectioned view of contours of a simulated poloidal flux at t=62 μs in the accelerator shown in FIG. 4A.
Figure 6B:
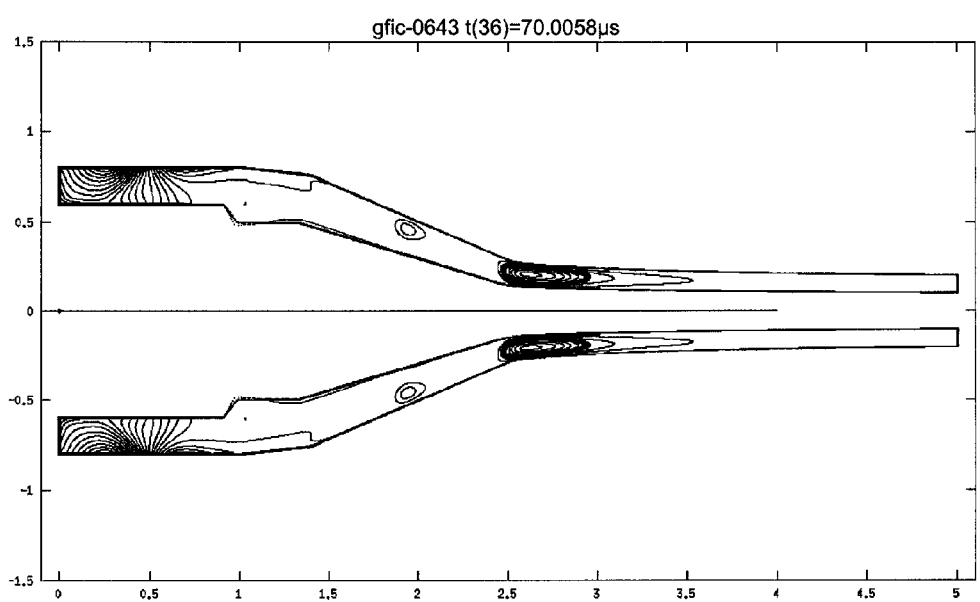
FIG. 6B is a longitudinally sectioned view of contours of a simulated poloidal flux at t=70 μs in the accelerator shown in FIG. 4A.

FIGS. 6A and 6B show a simulated operation of the system 10 having the parameters shown in FIG. 4A, and in particular show the contours of poloidal flux in the plasma propagation channel 118 at t=62 μs (FIG. 6A) and at t=70 μs (FIG. 6B). FIG. 6A shows the plasma torus 13 being compressed in the funnel section 110 as its front reaches the downstream end of funnel section 114. FIG. 6B illustrates the plasma torus 13 as it enters the elongated section 120. The plasma torus 13 can be pushed down the compression funnel section 110 at approximately 130 km/s to its end at z=2.5 m and then the acceleration circuit of the power source 24 is set to zero voltage when the plasma torus 13 enters the elongated section at 30 km/s at its beginning at z≈2.5 m. The simulations have shown that the plasma torus 13 can reach the end of the system 10 (outlet end 140) at t≈90 μs and speed of about 118 km/s.

According to another embodiment and referring to FIG. 7, a system 10 is provided with a relaxation region with an outward expansion zone. FIG. 7 shows a simulated operation of this system 10 having a funnel section with 2.5 m length and an elongated section with 4.5 m length. An outward expansion followed by inward compression can utilize a very steep taper in the compression funnel section 110 so this configuration might be more susceptible to blow-by occurrence.

Figure 8:
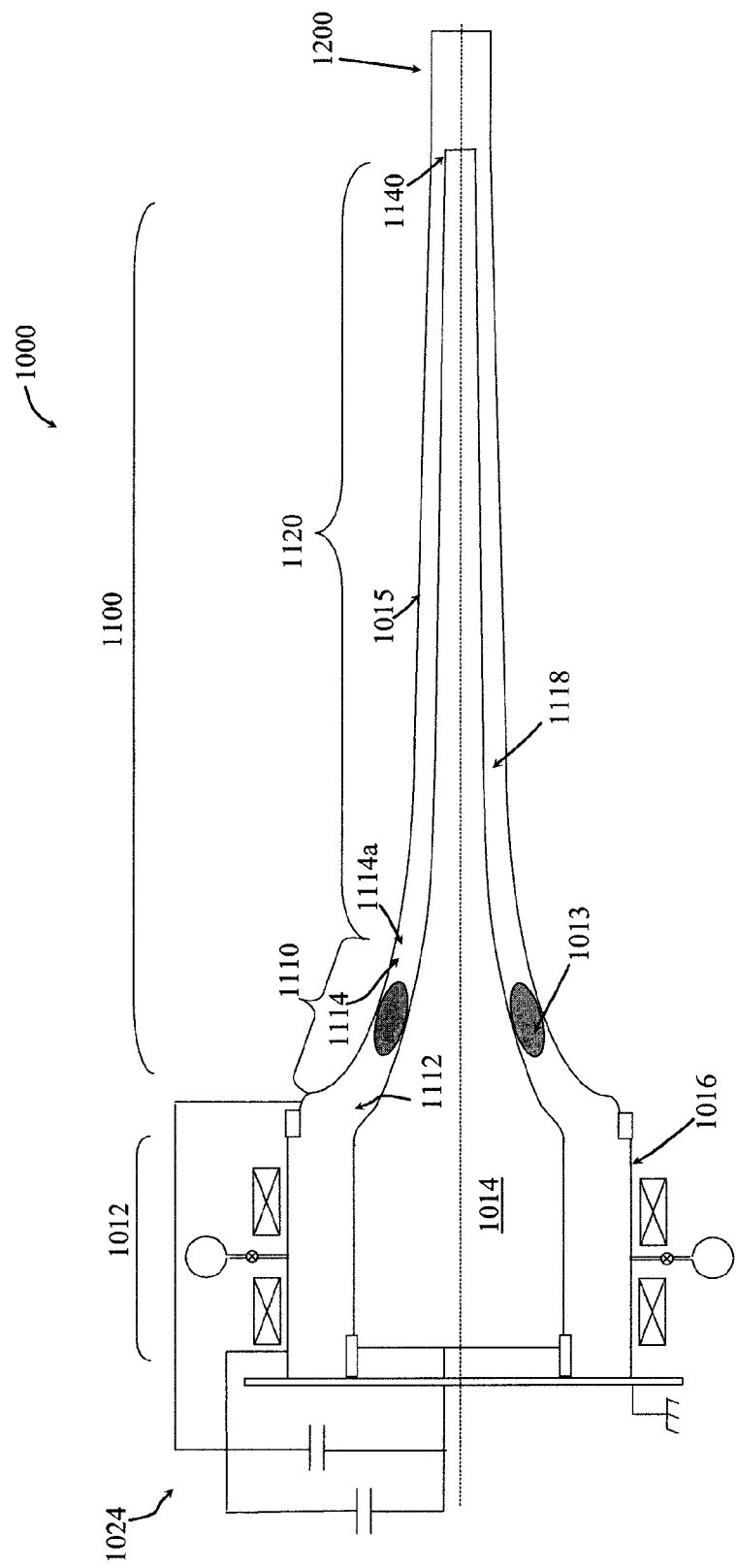
FIG. 8 is a schematic longitudinally sectioned view of another non-limiting embodiment of a plasma acceleration and compression system having a power source, a plasma generator, and an accelerator with an annular plasma propagation channel comprising an elongated section having a non-linear decreasing annular gap and no relaxation region.

According to yet another embodiment and referring to FIG. 8, a plasma compression and acceleration system 1000 is provided with no relaxation region. The system 1000 comprises a two sectional accelerator 1100 and a power source 1024. The system further comprises a plasma generator 1012 and a flux conservation region 1200 (e.g. a target chamber). The generator 1012 comprises a tubular inner (formation) electrode 1014 inserted within a tubular outer electrode 1016 to form an annular plasma formation channel therein between where a precise amount of gas can be injected. Once the gas has filled the plasma formation channel between the electrodes 1014 and 1016, the power source 1024 provides a plasma formation pulse to the plasma generator that includes a current discharged between the electrodes that ionizes the gas and can form a magnetized plasma torus 1013.

The accelerator 1100 includes an outer (accelerating) electrode 1015 into which the inner electrode 1014 is inserted creating an annular plasma propagation channel 1118 therein between, through which the plasma torus 1013 propagates toward the target chamber 1200. The accelerator 1100 comprises a compression funnel section 1110 and an elongated section 1120 downstream of and in fluid communication with the funnel section 1110. The compression funnel section 1110 is a conical tapered section and has an upstream end in fluid communication with the accelerator's inlet 1112, and a downstream end 1114 in fluid communication with an upstream end 1114a of the elongated section 1120.

In the funnel section 1110, the tapering can be relatively steep and can provide a radial compression of the plasma torus by a factor of about 3-10. The elongated section 1120 is longer than the funnel section 1110 with much relatively gentler tapering than the conical funnel section 1110, thus providing a smaller compression rate over longer lengthwise section. For example, a radial compression of the plasma torus along the length of the section 1120 can be by factor of about 1-2.

The elongated section 1120 has an upstream end 1114a that is connected to and in fluid communication with the downstream end 1114 of the funnel section 1110 and a downstream end in fluid communication with the outlet 1140 of the accelerator 1100. Like the embodiment shown in FIG. 2, the elongated section has a varying taper geometry, i.e. the annular gap of the annular propagation channel 1118 in the elongated section 1120 decreases non-linearly in a downstream direction along the length of the elongated section 1120. The elongated section 1120 can be configured to provide a relatively gradual transition from the steeper tapering of the funnel section 1110 to the gentler tapering provided along the length of the section 1120. For example, the section 1120 can be configured so that its upstream end comprises a large radius curvature providing a smooth change from the steep funnel section 1110.

The system 1000 comprises an outer drive, i.e. the power source is electrically coupled to the accelerator 1100 such that current flows from the power source 1024 across the outer electrode 1015, across the annular gap via the plasma torus, across the inner electrode 1014 then back to the power source. Once the power source 1024 is discharged, it can be decoupled (short circuited) from the system 1000 and the current can flow in the system 1000 in a loop.

Unlike the system 10 shown in FIG. 2, the system 1000 does not comprise a relaxation region or any other kind of expansion region. The power source is configured to generate the acceleration pulse as the plasma is still bubbling out from the generator 1012 so that a field-line tension of the pushing flux drives reconnection of the magnetic lines, snipping off a distended field lines, to form the plasma torus and at the same time pushing the plasma torus down the accelerator 1100.

In another embodiment, the system 1000 comprises an inner drive like the type shown in the system of FIG. 2.

Figure 9A:
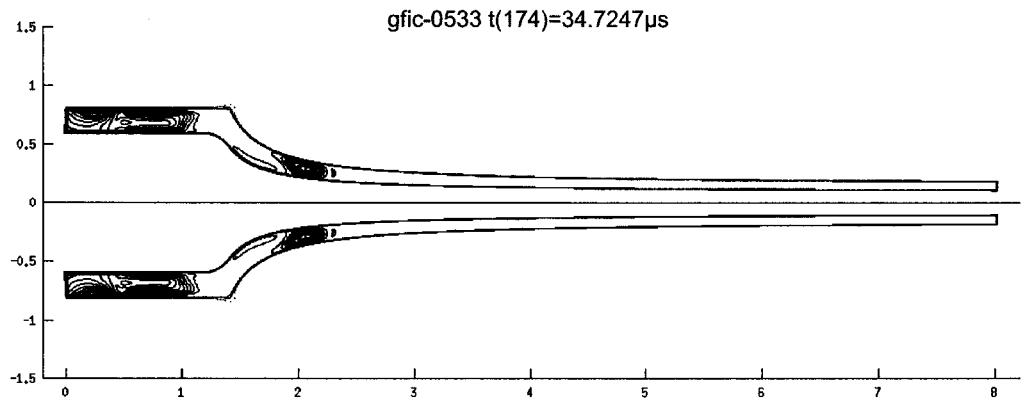
FIG. 9A is a longitudinally sectioned view of contours of a poloidal flux at t=35 μs in a simulated operation of the accelerator shown in FIG. 8.

Referring now to FIG. 9A, a simulated operation of the system 1000 shown in FIG. 8 shows the contours of the poloidal flux at t=35 μs. As can be noticed, the pushing flux accelerates and compresses the plasma torus down the compression funnel section 1110 of the accelerator 1100 toward its downstream end 1114. When the acceleration pulse from the power source is discharged, the plasma torus enters the elongated section 1120 where it is further accelerated and compressed towards the target chamber 1200 without additional flux being injected into the accelerator 1100.

Figure 9B:
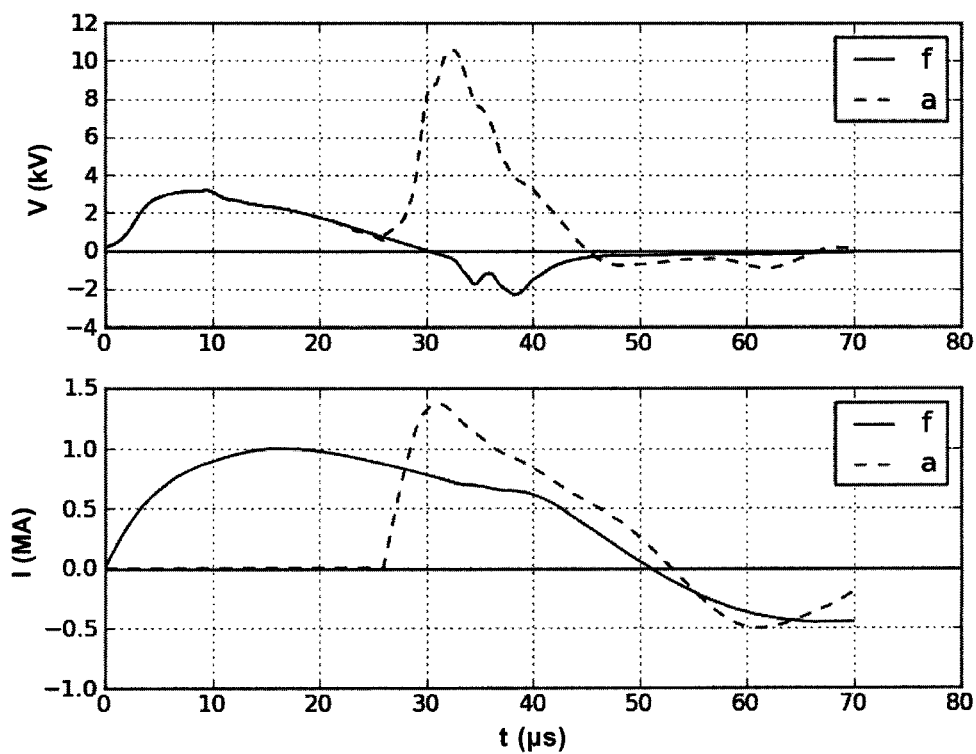
FIG. 9B are graphs of exemplary voltages (in kV) and currents (in MA) applied by the power source to the plasma generator and accelerator of FIG. 8, wherein the solid curve shows a voltage (upper graph) and a current (lower graph) of a plasma formation pulse applied to a formation region of the plasma generator and the dashed curves show a voltage (upper graph) and a current (lower graph) of the acceleration pulse applied to the accelerator as functions of time (in μs).

The voltage and current profiles of a plasma formation pulse and an acceleration pulse produced by the power source is shown in FIG. 9B. The voltage profile is shown in the upper plot and the current profile is shown in the lower plot and the plasma formation pulse is shown in solid line and the acceleration pulse is shown in dashed line, both as functions of time. As can be seen in this FIG., the acceleration pulse is triggered while the voltage/current from the plasma formation pulse is not discharged yet. The applied voltage of the acceleration pulse in the accelerator 1100 is around 11 kV. As the plasma formed in the generator 1012 bubbles out of the generator to form the plasma torus, the acceleration pulse is triggered so that the accelerating (pushing) current can drive reconnection of the magnetic lines to form the plasma torus and immediately accelerate the plasma torus down the accelerator. As the pushing current builds up, the plasma torus is compressed down the funnel section 1110 towards the junction 1114/1114a of the funnel and elongated sections 1110, 1120 so when the plasma torus enters the elongated section 1120 and starts travelling along it, no additional flux needs to be injected. In the simulated operation, the pushing current flowing in the accelerator when the plasma torus reaches the target chamber 1200 has decreased to about 0.25 MA due to the increased inductance in the elongated section 1120.

Although certain implementations of the accelerator have been described as including two sections, this is for illustrative purposes and is not a limitation or a requirement; in particular, the accelerator of the systems 10, 1000 can be provided only with a single elongated section having a varying tapering geometry such as that defined in equation 14, wherein the accelerator is provided with a sufficient inductance and pre-inductance to allow an acceleration pulse to generate a pushing flux that pushes the plasma torus to the outlet with a pushing current that is lower at the outlet than at the inlet of the elongated section. Alternatively, other embodiments can comprise three, four, five, or more elongated sections, wherein at least one of these sections has a varying tapering geometry. For example, the tapering can be "trumpet-shaped" in some embodiments. Relevant design parameters (e.g., tapers, inner/outer radii, lengths of sections, pushing currents, etc.) can be determined in each such implementation using the MHD modeling techniques described herein.

The plasma torus obtained in any of the disclosed embodiments can be a high energy plasma and can be suitable for applications such as, e.g., production of medical isotopes, neutron source, x-ray radiation source, nuclear fusion devices, etc. Embodiments of the above-described systems and methods can be used to compress a plasma that comprises a fusionable material. For example, the fusionable material may comprise one or more isotopes of light elements such as, e.g., deuterium, tritium, helium-3, lithium-6, lithium-7, etc. Accordingly, certain embodiments of the system may be configured and operated to act as neutron generators or neutron sources. Neutrons so produced have a wide range of practical uses in research and industrial fields. For example, a neutron source can be used for neutron activation analysis (NAA) which can provide multi-element analysis of major, minor, trace, and rare elements in a variety of substances (e.g., explosives, drugs, fissile materials, poisons, etc.) and can be used in a variety of applications (e.g., explosive detection and identification, ecological monitoring of the environment or nuclear waste, etc.). Embodiments of the system configured as a neutron source can also be used for materials research (e.g., analyzing the structure, dynamics, composition, and chemical uniformity of materials), for non-destructive testing of industrial objects (e.g., via neutron radiography and/or neutron tomography), and for many other industrial and technological applications. Embodiments of the above-described systems and methods for plasma compression are also suited for applications in the study of high energy density plasma including, for example, applications in astrophysics and nuclear physics.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and subcombinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example calculations, simulations, results, graphs, values, and parameters of the embodiments described herein are intended to illustrate and not to limit the disclosed embodiments. Other embodiments can be configured and/or operated differently than the illustrative examples described herein.

The invention claimed is:

1. An apparatus for accelerating and compressing plasma, comprising:
   a plasma accelerator comprising a tubular outer electrode and a tubular inner electrode extending inside the outer electrode such that an annular plasma propagation channel is defined therebetween for accelerating and compressing a plasma torus therethrough, the accelerator having an inlet for receiving the plasma torus from a plasma generator, an outlet for discharging an accelerated and compressed plasma torus, the plasma propagation channel having a lengthwise elongated section with an upstream end in fluid communication with the inlet and a downstream end in fluid communication with the outlet, and wherein a cross-sectional annular gap defined as a radial distance between the inner and outer electrodes decreases nonlinearly in a downstream direction along the length of the elongated section; and
   a power source electrically coupled to the accelerator and configured to provide an electrical acceleration pulse that produces a current that flows in the accelerator and generates a magnetic pushing flux behind the plasma torus that is sufficient to push the plasma torus from the upstream end and through the elongated section to the downstream end and the outlet of the accelerator;
   wherein the apparatus is configured to have a sufficient inductance before the elongated section that the plasma torus is accelerated and compressed throughout the elongated section by an expansion of the magnetic pushing flux, and wherein the dimensions of the plasma propagation channel are selected such that for a selected inductance of the elongated section and selected inductance before the elongated section, the current flowing in the elongated section at the downstream end is smaller than at the upstream end of the elongated section and a plasma torus pressure is greater at the downstream end of the elongated section than at the upstream end of the elongated section.

2. An apparatus as claimed in claim 1 wherein the elongated section has a plasma torus radial compression ratio of between 1 and 2.

3. An apparatus as claimed in claim 1 wherein the power source is configured to produce an acceleration pulse that provides simultaneous acceleration and compression of the plasma torus therethrough from the inlet of the accelerator to the outlet of the accelerator.

4. An apparatus as claimed in claim 1 wherein the plasma propagation channel further comprises a high compression funnel section between the inlet and the upstream end of the elongated section, the funnel section comprising an upstream end in fluid communication with the inlet and a downstream end in fluid communication with the upstream end of the elongated section, wherein a cross-sectional annular gap in the funnel section defined as a radial distance between the inner and outer electrodes decreases in a downstream direction along the length of the funnel section.

5. An apparatus as claimed in claim 4 wherein the funnel section has a radial compression ratio of between 3 and 10.

6. An apparatus as claimed in claim 1 wherein the elongated section has a fixed ratio of inner electrode and outer electrode radiuses, and the radius $r(z)$ of one of the inner or outer electrodes along a lengthwise position z of the elongated section is defined by $$\frac{1}{r(z)} = a - \frac{b}{1 + c(z - z_0)}$$

wherein $z_0$ is a lengthwise position of the elongated section at the upstream end, c is a ratio of inductance per unit length $L'$ of the elongated section to inductance $L_0$ before the elongated section, $a = b + 1/r_0$ wherein $r_0$ is the radius of the inner or outer electrode at the upstream end, and $$b = \frac{\frac{1}{r_1} - \frac{1}{r_0}}{1 - \frac{1}{1 + c(z_1 - z_0)}}$$

wherein $r_1$ and $z_1$ are the respective radius of the inner or outer electrode and the lengthwise position of the elongated section at the downstream end.

7. An apparatus as claimed in claim 1 wherein the radius $r(z)$ of each of the inner and outer electrodes along a lengthwise position z of the elongated section is defined by $$\frac{1}{r(z)} = a - \frac{b}{1 + c(z - z_0)}$$

wherein $z_0$ is a lengthwise position of the elongated section at the upstream end, c is the ratio of inductance per unit length L' of the elongated section to inductance $L_0$ before the elongated section, $$a = b + 1/r_0$$

wherein $r_0$ is the radius of the inner or outer electrode at the upstream end, and $$b = \frac{\frac{1}{r_1} - \frac{1}{r_0}}{1 - \frac{1}{1 + c(z_1 - z_0)}}$$

wherein $r_1$ and $z_1$ are the respective radius of the inner or outer electrode and the lengthwise position of the elongated section at the downstream end.

8. An apparatus as claimed in claim 1 wherein the power source is configured to generate an electrical acceleration pulse that stops once the plasma torus enters the elongated section.

9. An apparatus as claimed in claim 8 wherein the power source is configured to generate an electrical acceleration pulse with a timing, duration and current amplitude that results in a constant pushing flux when the plasma torus travels along the elongated section.

10. A system comprising
the apparatus for accelerating and compressing plasma as claimed in claim 1, and
a plasma generator comprising a tubular outer electrode and a tubular inner electrode extending inside the outer electrode to define an annular plasma formation channel therebetween,
wherein the outer electrode of the accelerator is physically connected to the outer electrode of the plasma generator, and wherein the annular plasma formation channel is aligned and in fluid communication with the annular plasma propagation channel.

11. A system as claimed in claim 10, further comprising a plasma torus relaxation region defined by an inner wall of the outer electrode and a space between the upstream end of the accelerator inner electrode and a downstream end of the plasma generator inner electrode, and wherein the relaxation region is in fluid communication with the plasma formation channel and the plasma propagation channel.

12. A system as claimed in claim 11 wherein the relaxation region comprises an inward expansion zone formed at the upstream end of the accelerator inner electrode.

13. A system as claimed in claim 11 wherein the relaxation region comprises an outward expansion zone formed at the upstream end of the accelerator at the outer electrode.

* * * * *